(12) United States Patent
Nietfeld

(10) Patent No.: US 10,635,202 B1
(45) Date of Patent: Apr. 28, 2020

(54) DYNAMIC SENSOR ASSIGNMENT

(71) Applicant: Valve Corporation, Bellevue, WA (US)

(72) Inventor: Scott Douglas Nietfeld, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/223,956

(22) Filed: Dec. 18, 2018

(51) Int. Cl.
*G06F 3/03* (2006.01)
*G06F 3/038* (2013.01)
*G06F 3/044* (2006.01)
*A63F 13/24* (2014.01)
*A63F 13/218* (2014.01)
*A63F 13/214* (2014.01)

(52) U.S. Cl.
CPC ............ *G06F 3/038* (2013.01); *A63F 13/214* (2014.09); *A63F 13/218* (2014.09); *A63F 13/24* (2014.09); *G06F 3/044* (2013.01); *A63F 2300/1043* (2013.01); *G06F 2203/04105* (2013.01)

(58) Field of Classification Search
USPC ................................................ 345/170–178
See application file for complete search history.

(56) References Cited

U.S. PATENT DOCUMENTS

| | | | |
|---|---|---|---|
| 2013/0106718 A1* | 5/2013 | Sundara-Rajan | ... G06F 3/03545 345/173 |
| 2018/0055434 A1* | 3/2018 | Cheung | ............... G06F 19/3418 |
| 2018/0262991 A1* | 9/2018 | Rao | ......................... H04L 12/12 |

* cited by examiner

*Primary Examiner* — Tony O Davis
(74) *Attorney, Agent, or Firm* — Lee & Hayes, P.C.

(57) ABSTRACT

A method including receiving data corresponding to one or more objects in proximity to the controller, determining scores for controller configurations of the controller, ranking the scores of controller configurations, selecting a controller configuration among the controller configurations, and configuring a touch sensor of the controller according to a selected controller configuration.

20 Claims, 14 Drawing Sheets

FIRST CONTROLLER CONFIGURATION
700

THIRD CONTROLLER CONFIGURATION
728

DYNAMIC SENSOR ASSIGNMENT

BACKGROUND

Handheld controllers are used in an array of architectures for providing input, for example, to a remote computing device. For instance, handheld controllers are utilized in the gaming industry to allow players to interact with a personal computing device executing a gaming application, a game console, a game server, and/or the like. Handheld controllers may find use in virtual reality (VR) environments and may mimic natural interactions such as grasping, throwing, squeezing, etc., as much as possible. While current handheld controllers provide a range of functionality, further technical improvements may enhance user experiences.

DETAILED DESCRIPTION

Figure 1:
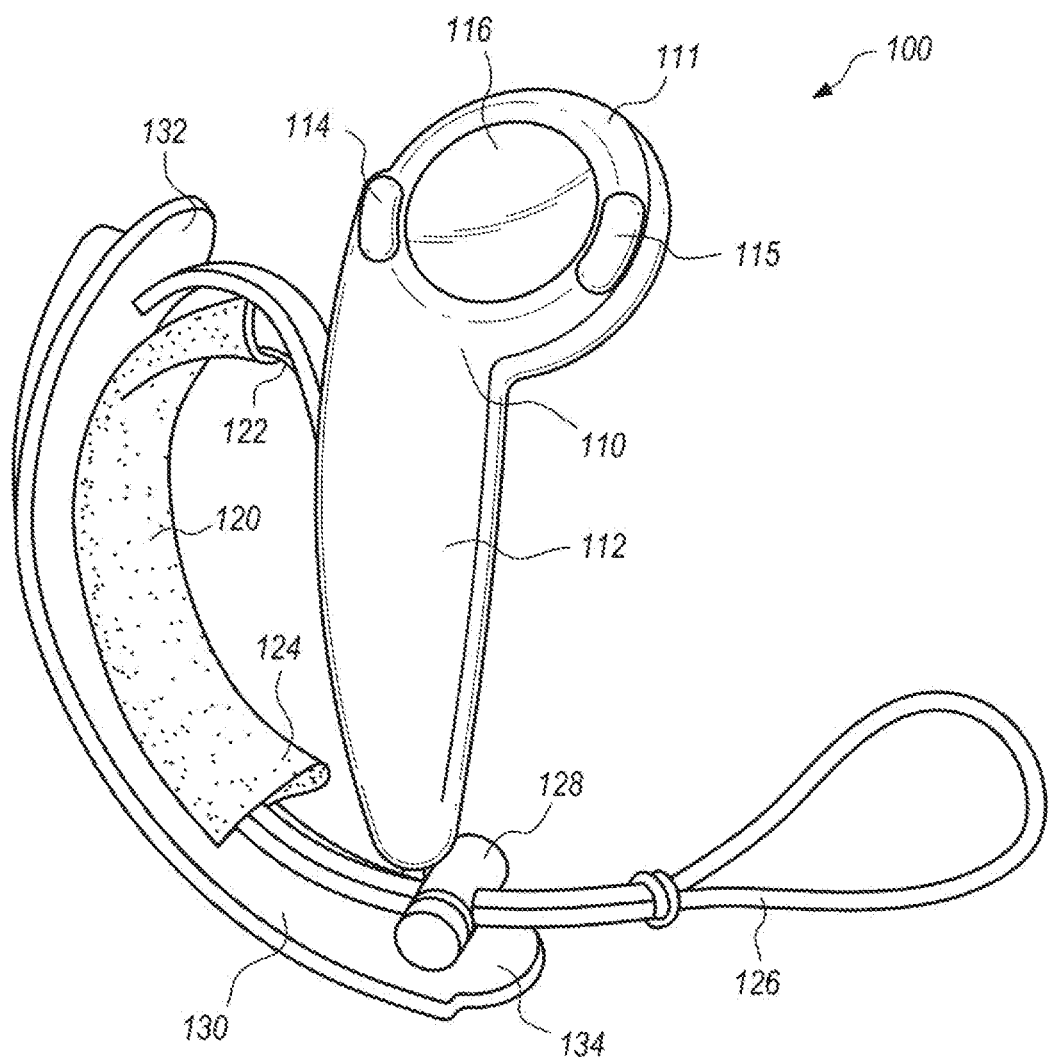
FIG. 1 depicts a controller according to an example embodiment of the present disclosure, with a hand retainer in an open position.

Described herein are, among other things, handheld controllers having touch-sensitive controls, methods for using outputs of the touch-sensitive controls, and methods for dynamically adjusting the touch-sensitive controls based on a hand size and/or grip of a user operating the handheld controller. In some instances, the handheld controller described herein may control a remote device (e.g., a television, audio system, personal computing device, game console, etc.), to engage in video game play, and/or the like.

The handheld controller may include one or more controls such as one or more joysticks, trackpads, trackballs, buttons, or other controls that are controllable by the user operating the handheld controller. Additionally, or alternatively, the handheld controller may include one or more controls that include a touch sensor configured to detect a presence, proximity, location, and/or gesture of the user on respective controls of the handheld controller. The touch sensor may comprise a capacitive touch sensor, a force resistive touch sensor, an infrared touch sensor, a touch sensor that utilizes acoustic soundwaves to detect a presence or location of an object, a proximity of an object, and/or any other type of sensor configured to detect touch input at the handheld controller or a proximity of one or more objects relative to the handheld controller. Additionally, in some instances, the touch sensor may comprise capacitive pads.

The touch sensor communicatively couples to one or more processors of the handheld controller to send touch sensor data indicative of touch input at the handheld controller. The touch sensor data may also indicate a closeness or proximity of one or more fingers relative to the handheld controller. The touch sensor data may indicate a location of the touch input on the handheld controller and/or may indicate a location of the fingers relative to the handheld controller, potentially as they change over time. For instance, if the fingers of the user hover or are disposed away from the handheld controller, the touch sensor data may indicate how extended or close the fingers are with respect to the handheld controller.

The handheld controller may also include logic (e.g., software, hardware, firmware, etc.) that is configured to receive the touch sensor data and determine the presence of a finger of the user and/or a location (or "position") of the finger(s) on the handheld controller(s). For example, in instances where the touch sensor comprises the capacitive pads, different regions or groups of capacitive pads may represent or correspond to different fingers of the user and the logic may determine which region(s) and/or group(s) of capacitive pads detect a capacitance. The handheld controller may provide this information to a game or other application for performing one or more actions at the handheld controller, such as a gesture performed by finger(s) touching or in close proximity to the handheld controller. For instance, the handheld controller may transmit the touch sensor data or other indications to a gaming console, a remote system, other handheld controller(s), or other computing devices. The computing devices may utilize the touch sensor data and/or indications to perform one or more actions, such as generating image data corresponding to a hand gesture of the user.

The logic of the handheld controller (or a computing device communicatively coupled to the handheld controller) may use the touch sensor data, such as the capacitance values, to identify a controller configuration for the user. The handheld controller, or the computing device, may store different controller configurations that represent a different assignment of capacitive pads for respective fingers of the user. That is, as noted above, the capacitive pads of the touch sensor may be segmented into groups and each group may correspond to or associate with a respective finger of the hand (e.g., pinky finger, ring finger, middle finger, and index finger). For respective controller configurations capacitive pads of the touch sensor may be associated with respective fingers of the hand. As such, when receiving data from the touch sensor, the logic may associate the touch sensor data with a corresponding finger of the user, which may in turn be utilized to identify a hand gesture. In other words, knowing which capacitive pad(s) correspond to respective fingers of the hand allows the logic to determine a corresponding hand gesture of the user, such as which fingers grip the handheld controller and/or which fingers do not grip the handheld controller. For instance, the logic may determine the user grips the handheld controller with the middle finger and the ring finger, but not the pinky finger. As such, knowing which capacitive pad(s), or group of capacitive pad(s) correspond to the respective fingers of the hand, the logic may provide an indication of this gesture to an application configured to perform a predefined action associated with the gesture or generate image data corresponding to the gesture (e.g., middle finger and ring finger grip an object, while the pinky finger does not grip the object). Moreover, through utilizing touch sensor data associated with a proximity of the fingers relative to the handheld controller, such as detected capacitance values, the logic of the handheld controller may determine an amount of curl or extension associated with each finger (e.g., how far the fingers are disposed away from handheld controller).

The handheld controller may dynamically adjust, detect, and accommodate for varying grips of the user or different users that operate the handheld controller. For instance, as the grip of the user may change depending on how the user holds the handheld controller, what game the user plays, and/or physical features of the hand of the user (e.g., length of finger, width of finger, etc.). The touch sensor may therefore adapt to different grips of the user. Additionally, as users may hold the handheld controller differently, the touch sensor may adapt to the grip of users. In other words, even for different users with similar hands, or as a user progresses throughout gameplay, the grip of the user may change (e.g., the fingers of the user may grip different parts of handheld controller). To accommodate for the varying grips and to enhance a gameplay experience, the logic may remap or re-associate the capacitive pads of the touch sensor according to different controller configurations. In doing so, the logic of the controller may associate the touch sensor data with certain fingers of the user to accurately portray a hand gesture of the user.

To briefly illustrate, the handheld controller or the computing device communicatively coupled to the handheld controller (e.g., gaming console) may generate scores using a machine learning approach and the touch sensor data. The handheld controller, or the computing device, may select a controller configuration with the highest score (or closely matched controller configuration) and configure the handheld controller according to the selected controller configuration. Such configuring may map certain capacitive pads of touch sensor to fingers of the user (e.g., middle, ring, pinky, etc.). That is, to accurately portray hand gestures of the user in gameplay (e.g., a VR environment), the handheld controller (or the computing device) may configure, based on selecting the controller configuration, capacitive pads of the touch sensor to correspond to certain fingers. Subsequently, in receiving touch sensor data, the handheld controller may associate capacitive pad(s) with a corresponding finger, thereby knowing the relative locations and/or proximity of the finger in relation to the handheld controller. However, the capacitive pads may also measure a proximity of the fingers relative to the handheld controller, for instance, through measuring capacitance. Through continuously scoring the controller configurations, the handheld controller may dynamically adapt to the grip of the user and associated the capacitive pads with respective fingers of the user. The handheld controller may therefore reassign or remap certain capacitive pads of the touch sensor to associate with certain fingers of the user. In turn, the touch sensor data may be used to accurately portray the hand of the user (e.g., in a VR environment).

The handheld controller may also sense, detect, or measure, via the touch sensor and/or a pressure sensor, an amount of force associated with touch input at the handheld controller. For instance, as a finger of a user presses against the handheld controller, a portion of the controller, such as a cover disposed above the touch sensor and/or the pressure sensor, may deflect to contact the touch sensor and/or the pressure sensor. The pressure sensor may couple to the one or more processors such that touch input of the finger may result in force data being provided to the one or more processors. The pressure sensor may provide force data indicative of an amount of force of the touch input to the one or more processors. In some instances, the pressure sensor may comprise a force-sensing resistor (FSR) sensor, a piezoelectric sensor, a load cell, a strain gauge, a capacitive-type pressure sensor that measures capacitive force measurements, or any other type of pressure sensor. Additionally, in some instances, the touch sensor data and/or the force data may be interpreted together and associated with a predefined command (e.g., squeezing).

While traditional handheld controllers may include sensors to sense touch input, traditional controllers statically map the touch sensor to associate with certain fingers. Such mapping, however, does not reassign portions of the touch sensor, such as the capacitive pads, to certain fingers or dynamically adapt the touch sensor to different fingers depending on the grip of the user. This static mapping may lead to a user experience within a gameplay environment that is less than ideal. For instance, if the touch sensor data does not accurately map to a respective finger of the user, the generated hand image may not accurately depict the hand of the user operating the handheld controller. The techniques and systems described herein improve upon existing technology to dynamically assign capacitive pads of the touch sensor or correlate the capacitive pads to certain fingers of the user. In doing so, image data generated from touch sensor data may accurately depict the fingers of the user, which may enrich gameplay experience and/or other applications being controlled by the handheld controller.

FIG. 1 is a front view of an example controller 100 that may include one or more touch-sensitive controls. As will be discussed herein, the touch-sensitive controls may generate touch sensor data utilized by the controller 100 and/or other computing devices to generate hand gestures of the user. The touch sensor data may indicate a presence, location, closeness, and/or gesture of a finger(s) of a user operating the controller 100. In some instances, the controller 100 may be utilized by an electronic system such as a VR video gaming system, robot, weapon, or medical device.

As illustrated, the controller 100 may include a controller body 110 having a handle 112, and a hand retainer 120. The controller body 110 may include a head disposed between the handle 112 and a distal end 111 of the controller 100, which may include one or more thumb-operated controls 114, 115, 116. For example, a thumb-operated control may include a tilting button, or any other button, knob, wheel, joystick, or trackball conveniently manipulated by a thumb of a user during normal operation when the controller 100 is held in the hand of the user.

The handle 112 may include a substantially cylindrical tubular housing. In this context, a substantially cylindrical shape need not have constant diameter, or a perfectly circular cross-section.

The handle 112 may include a proximity sensor and/or a touch sensor having a plurality of capacitive sensors spatially distributed partially or completely around an outer surface of the handle 112. For example, the capacitive sensors may be spatially distributed beneath the outer surface of the handle 112 and/or may be embedded under the outer surface of the handle 112. The capacitive sensors may be responsive to a user touching, gripping, or grasping the handle 112 to identify the presence, position, and/or gestures of one or more fingers of the user. Additionally, the capacitive sensors may be responsive to one or more fingers hovering or being disposed above the handle 112. For instance, one or more fingers of the user may not grasp or wrap around the controller 100 but instead, may be displaced above the outer surface of the handle 112. To accommodate such and detect a proximity of the fingers and/or touch input, the outer surface of the handle 112 may comprise an electrically insulative material.

The hand retainer 120 may couple to the controller 100 to bias the palm of the hand of the user against the outside surface of the handle 112. As shown in FIG. 1, the hand retainer 120 is in the open position. The hand retainer 120 may optionally bias in the open position by a curved resilient member 122 to facilitate the insertion of the hand of the user between the hand retainer 120 and the controller body 110 when the user grasps the controller 100. For example, the curved resilient member 122 may include a flexible metal strip that elastically bends, or may comprise an alternative plastic material such as nylon, that may bend substantially elastically. A fabric material 124 (e.g., a neoprene sheath), may partially or completely cover the curved resilient member 122 to cushion or increase a comfort of the user. Alternatively, the cushion or fabric material 124 may adhere to only the side of the curved resilient member 122 facing the hand of the user.

The hand retainer 120 may adjust in length, for example, by including a draw cord 126 that is cinched by a spring-biased chock 128. The draw cord 126 may optionally have an excess length for use as a lanyard. In some examples, the cushion or fabric material 124 may attach to the draw cord 126. In addition, the curved resilient member 122 may be preloaded by the tension of the cinched draw cord 126 and in such embodiments, the tension that the curved resilient member 122 imparts to the hand retainer 120 (to bias it in the open position) may cause the hand retainer 120 to automatically open when the draw cord 126 is un-cinched. However, alternative conventional ways to adjust the length of a hand retainer 120, such as a cleat, an elastic band (that temporarily stretches when the hand is inserted, so that it applies elastic tension to press against the back of the hand), a hook & loop strap attachment that allows length adjustment, etc. may be used.

The hand retainer 120 may be disposed between the handle 112 and a tracking member 130, and may contact the back of the hand of the user. The tracking member 130 may affix to the controller body 110 and may optionally include two noses 132, 134, where each nose may protrude from a corresponding one of two opposing distal ends of the tracking member 130. In some instances, the tracking member 130 may include an arc having a substantially arcuate shape. In some instances, the tracking member 130 may include tracking transducers disposed therein, for example, with at least one tracking transducer disposed in each protruding nose 132, 134. The controller body 110 may include additional tracking transducers, such as a tracking transducer disposed adjacent the distal end 111.

The controller 100 may include a rechargeable battery disposed within the controller body 110, and the hand retainer 120 may include an electrically-conductive charging wire electrically coupled to the rechargeable battery. The controller 100 may also include a radio frequency (RF) transmitter for communication with the rest of an electronic system (e.g., gaming console). The rechargeable battery may power the RF transmitter and the RF transmitted may respond to the thumb-operated controls 114, 115, 116, the touch sensor (e.g., the capacitive sensors) in the handle 112, and/or tracking sensors in the tracking member 130.

In some instances, the controller body 110 may comprise a single piece of injection molded plastic or any other material rigid enough to transfer a force from a finger of the user to the touch sensor and thin enough to allow for capacitive coupling between a finger of the user and the touch sensor. Alternatively, the controller body 110 and the tracking member 130 may be fabricated separately, and then later assembled together.

Figure 2:
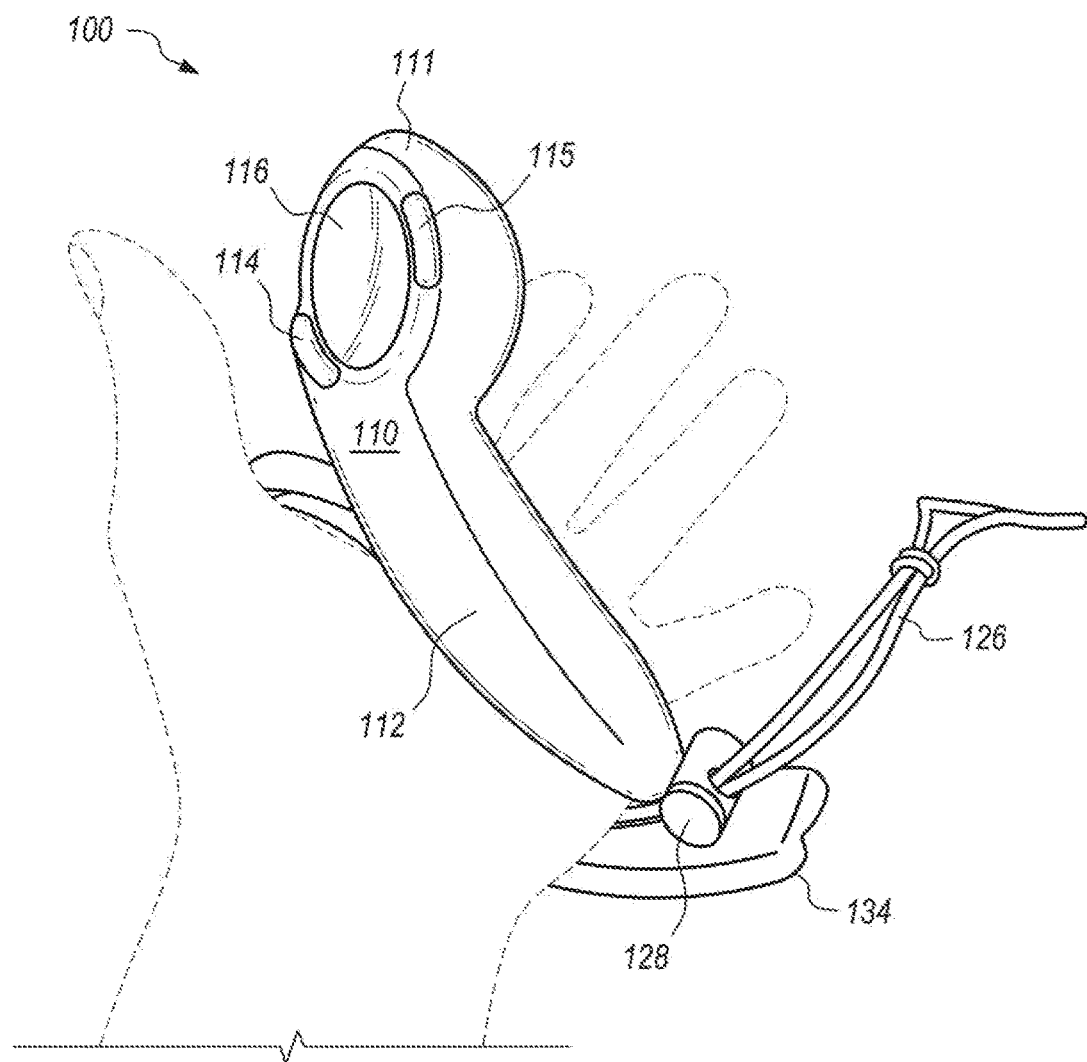
FIG. 2 depicts the controller of FIG. 1 in an open, palm-up, hand of a user according to an example embodiment of the present disclosure.

FIG. 2 is a front view of the controller 100, showing the controller 100 during operation with the left hand of the user inserted therein but not grasping the controller body 110. In FIG. 2, the hand retainer 120 is cinched over the hand of the user to physically bias the palm of the user against the outside surface of the handle 112. Here, the hand retainer 120, when closed, may retain the controller 100 within the hand of the user even when the hand is not grasping the controller body 110. As shown, when the hand retainer 120 is closed tightly around the hand of the user, the hand retainer 120 may prevent the controller 100 from falling out of hand of the user. Hence, in some embodiments, the hand retainer 120 may allow the user to "let go" of the controller 100 without the controller 100 actually separating from the hand, being thrown, and/or dropped to the floor, which may enable additional functionality. For example, if the release and restoration of the user grasping the handle 112 of the controller body 110 is sensed, the release or grasping may be incorporated into the game to display throwing or grasping objects (e.g., in VR environment). The hand retainer 120 may allow such a function to be accomplished repeatedly and safely.

The hand retainer 120 may also prevent fingers of the user from excessively translating relative to the touch sensor to more reliably sense finger motion and/or placement on the handle 112.

Figure 3:
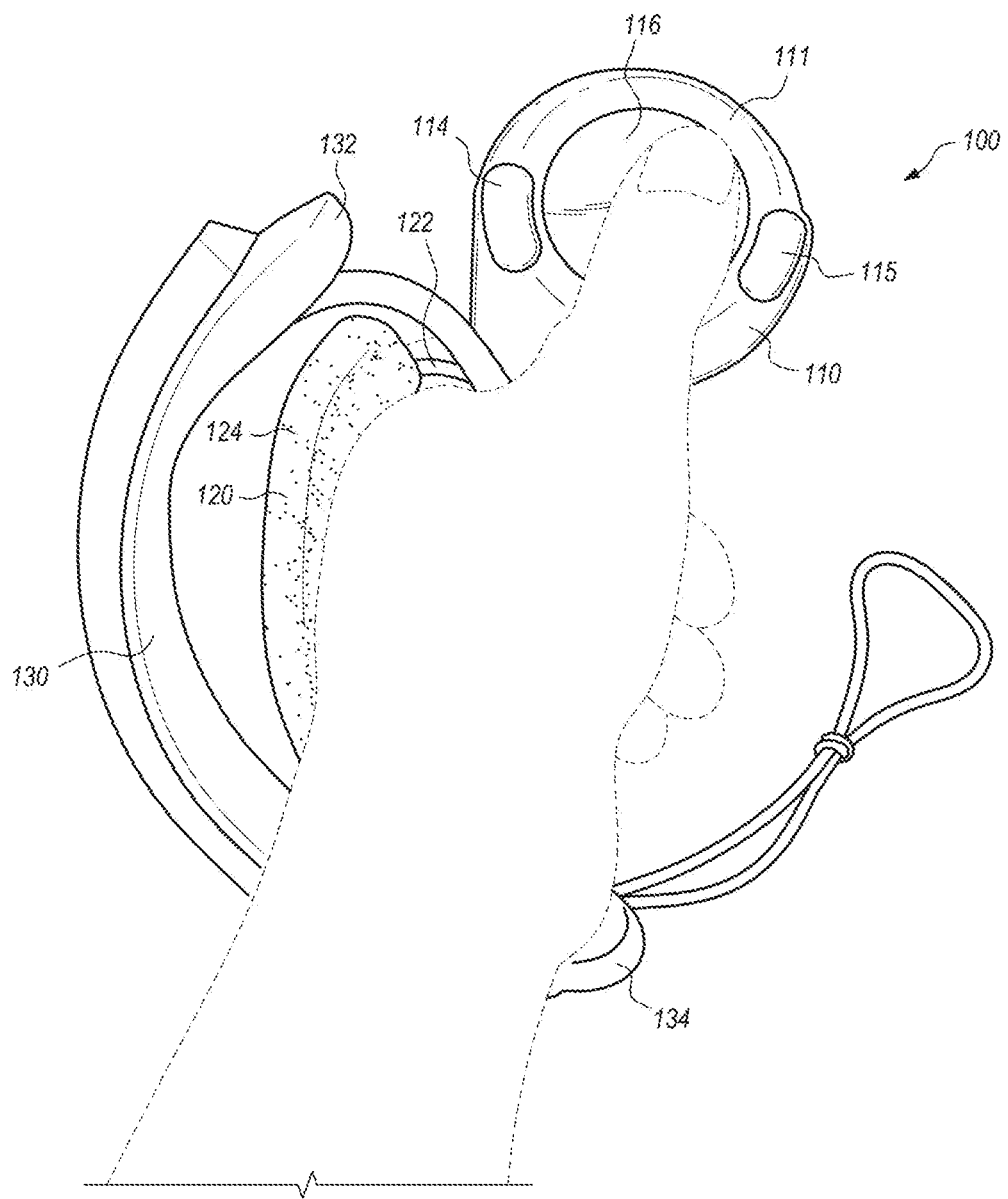
FIG. 3 depicts the controller of FIG. 1 in a closed hand of the user according to an example embodiment of the present disclosure.
Figure 4:
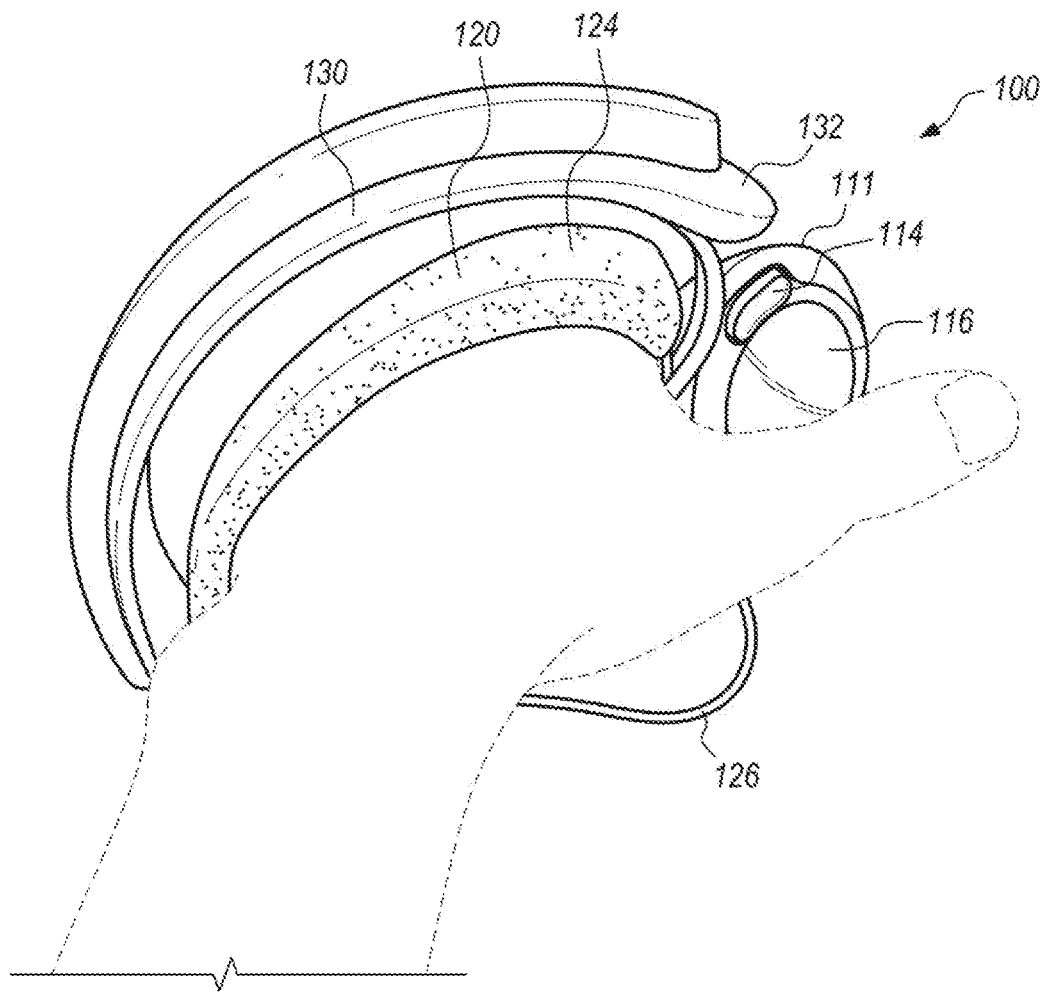
FIG. 4 depicts the controller of FIG. 1 in closed, palm-down, hand of the user according to an example embodiment of the present disclosure.

FIGS. 3 and 4 depict the controller 100 during operation when the hand retainer 120 is cinched while the hand of the user grasps the controller body 110 to retain the controller 100 in the hand of the user. As shown in FIGS. 3 and 4, the thumb of the user may operate one or more of the thumb-operated controls 114, 115, 116.

Figure 5:
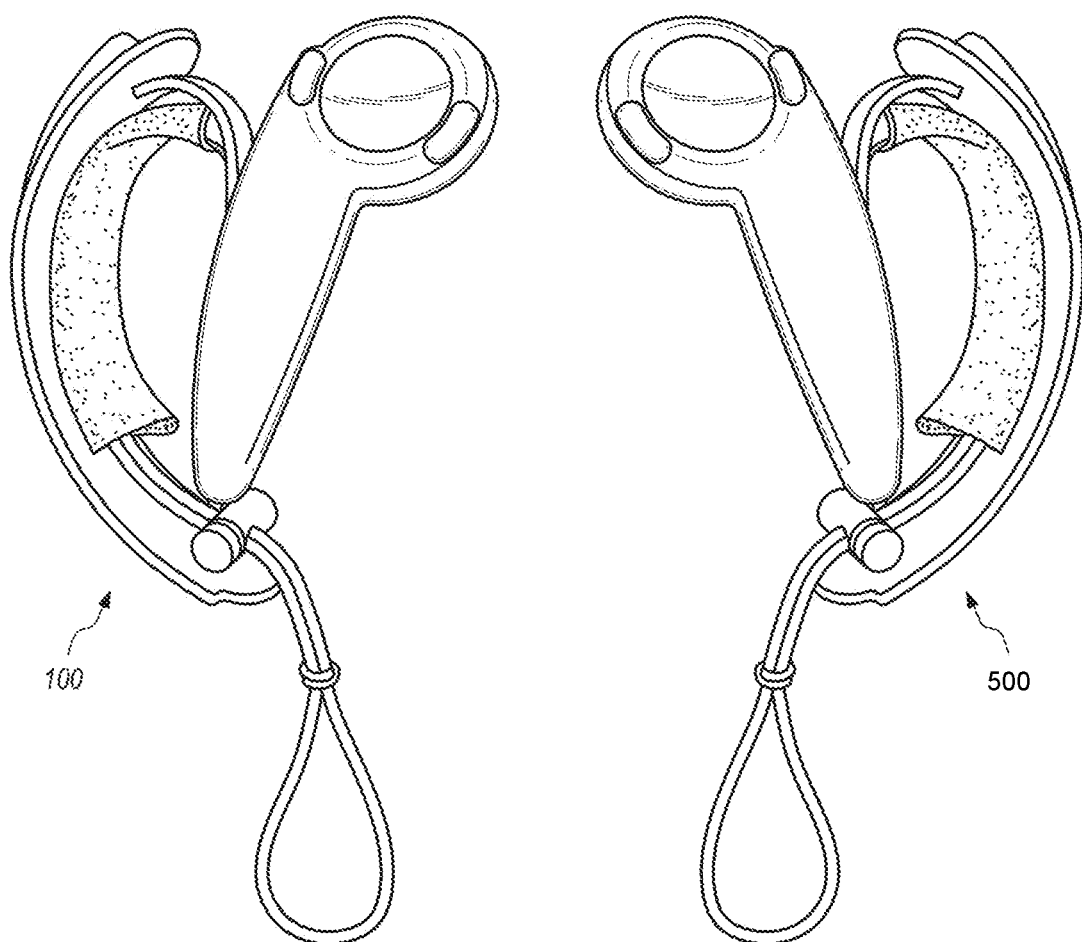
FIG. 5 depicts a pair of controllers according to an example embodiment of the present disclosure, with hand retainers in an open position.

FIG. 5 illustrates that in certain embodiments, the controller 100 may be the left controller in a pair of controllers that includes a similar right controller 500. In certain embodiments, the controllers 100 and 500 may (together) track the motion and grip of both of the hands of the user, simultaneously, for example, to enhance a VR experience.

Figure 6:
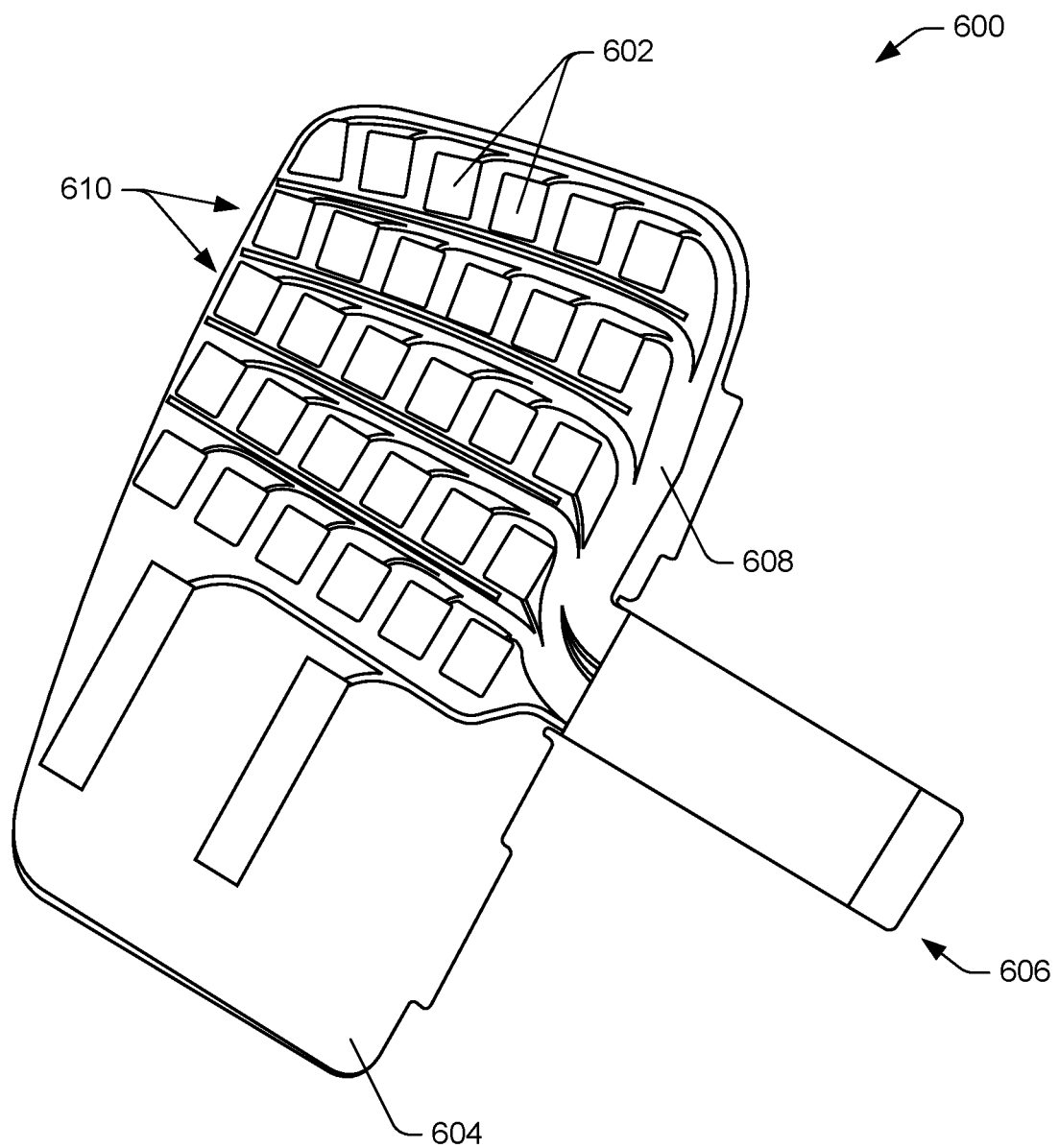
FIG. 6 depicts a touch sensor of the controller of FIG. 1, according to an example embodiment of the present disclosure.

FIG. 6 illustrates a proximity sensor or a touch sensor 600 having a plurality of capacitive pads 602 configured to detect touch input on a controller (e.g., the controller 100) as well as a proximity of one or more objects (e.g., finger) relative to the controller 100. In some embodiments, the touch sensor 600 may additionally or alternatively include different types of sensors configured to detect touch input at the controller 100 or a proximity of a finger(s) relative to the controller 100, such as an infrared or acoustic sensor. As shown in FIG. 6, the capacitive pads 602 of the touch sensor 600 are not necessarily of equal size and do not necessarily have substantially equal spacing therebetween. However, in some embodiments, the capacitive pads 602 may comprise a grid, with substantially equally spacing therebetween, and of substantially equal size.

The touch sensor 600 may include a flexible printed circuit assembly (FPCA) 604 on which the capacitive pads 602 are disposed. The FPCA 604 may include a connector 606 for connecting to a printed circuit board (PCB) of the controller 100 that includes one or more processors. The capacitive pads 602 may communicatively connect to the connector 606 via traces 608 disposed on the FPCA 604. The capacitive pads 602 may provide touch sensor data (e.g., capacitance value) to the one or more processors of the controller 100 via the traces 608 and the connector 606. As discussed in more detail herein, the touch sensor data may indicate the proximity of the finger relative to the controller 100. That is, the touch sensor 600 may measure the capacitance of individual capacitive pads 602, where the capacitance may be associated with a proximity of the fingers relative to the controller 100 (e.g., touching or being disposed above the handle 112 of the controller 100).

The touch sensor 600 may couple to an interior surface within the controller body 110, such as a structure mounted within the handle 112 of the controller body 110, or a structure mounted underneath the handle 112 of the controller body 110. In doing so, touch sensor 600 may be disposed beneath the outer surface of the handle 112 detect a proximity of the fingers relative to the handle 112. When coupled to the controller 100, the touch sensor 600 may angularly span around a circumference or a portion of the handle 112. For instance, the FPCA 604 may couple (e.g., adhesion) to the inner surface of the controller body 110 at the handle 112 to detect the proximity of the fingers relative to the handle 112. In some embodiments, the touch sensor 600 may extend at least 100 degrees but not more than 170 degrees around the circumference of the handle 112. Additionally, or alternatively the touch sensor 600 may couple to the outer surface of the controller 110, such as an outer surface of the handle 112.

The capacitive pads 602 may be spaced apart from one another to detect a proximity of different fingers relative to the controller 100, or different portions of the finger(s) of the user (e.g., fingertip). For instance, as shown in FIG. 6, the capacitive pads 602 are arranged into rows, columns, a grid, sets, subsets, or groups 610. In some instances, individual groups 610 of the capacitive pads 602 may correspond to a particular finger of the user (e.g., index finger, middle finger, ring finger, pinky finger). Additionally, or alternatively, multiple groups 610 of the capacitive pads 602 or capacitive pads 602 from multiple groups 610 may correspond to a single finger of the user. For instance, two or more groups 610 may correspond to a finger of the user (e.g., middle finger).

As shown in FIG. 6, the touch sensor 600 may include six groups 610 of capacitive pads 602, where the groups 610 extend horizontally across a surface of the FPCA 604. However, in some embodiments, the touch sensor 600 may include more than six groups 610 or less than six groups 610.

Through arranging the capacitive pads 602 into the groups 610, or assigning certain capacitive pads 602 to certain groups 610, the controller 100 (or another communicatively coupled computing device) may utilize touch sensor data (e.g., capacitance values) from the capacitive pads 602 to generate hand gestures of the user. That is, the touch sensor 600 may generate touch sensor data for use in detecting a presence, location, and/or gesture of the finger(s) of the user that grip the controller 100. In these instances, as the user grips the controller 100 with certain fingers and hovers certain fingers above the controller 100, a voltage is applied to the capacitive pads 602 that results in an electrostatic field. Accordingly, when a conductor, such as a finger of a user touches or nears the capacitive pads 602, a change in capacitance occurs. The capacitance may be sensed by connecting an RC oscillator circuit to touch sensor 600 and noting that a time constant (and therefore the period and frequency of oscillation) will vary with the capacitance. In this way, as a user releases finger(s) from the controller 100, grips the controller 100 with certain finger(s), or nears the controller 100, the controller 100 may detect a change in capacitance.

The capacitance values of the capacitive pads 602, or individual capacitive sensors within a grid on each capacitive pad 602, are used to determine the location of the conductor as well as the proximity of the conductor relative to the capacitive pad 602. That is, as a user grips the controller 100, certain fingers and/or portions of the fingers may contact the handle 112 of the controller 100. As the finger(s) act as a conductor, those capacitive pads 602 underlying the handle 112 where the user touches the handle 112 may measure a capacitance value. These capacitance values are measured over time for use in identifying a gesture of the user. However, in instances where the user hovers their fingers or certain portions of their finger away from the controller 100, the capacitance value may represent or be associated with how far the finger is disposed away from the controller 100. The touch sensor data may therefore be utilized to determine the proximity and/or location of the fingers with respect to the controller 100. As the grip of the user may change throughout a gameplay experience, or between different users, it may become beneficial to associate the fingers with different capacitive pads 602 of the touch sensor 600. For example, at a first instance, a user may have a wide grip and all capacitive pads 602 of the touch sensor 600 may detect a capacitance value for use in generating image data. At a second instance, the grip of the user may narrow, and less than all of the capacitive pads 602 of the touch sensor 600 may detect a capacitance value for use in generating the image data. That is, to generate accurate image data depicting the gesture of the hand, the capacitive pads 602 may dynamically correlate or associate with certain fingers of the hand. In other words, to generate a corresponding hand gesture of the user, the controller 100 or a communicatively coupled computing device, may utilize the touch sensor data (e.g., capacitance values). Knowing which capacitive pads 602 of the touch sensor 600 are associated with respective fingers of the hand allows for the generation of a corresponding hand gesture using the capacitance values detected by the touch sensor 600. Therefore, with a changing grip of the user, the capacitive pads 602 may regroup or associate with different fingers such that their capacitance values produce accurate image data depicting a hand gesture.

The one or more processors may include algorithms and/or machine-learning techniques embodying anatomically-possible motions of fingers, to better use the touch sensor data to detect the opening the hand of a user, finger pointing, or other motions of fingers relative to the controller 100 or relative to each other. In this way, the movement of the controller 100 and/or fingers of the user may help control a VR gaming system, defense system, medical system, industrial robot or machine, or another device. In VR applications (e.g. for gaming, training, etc.), the touch sensor data may be utilized to render the release of an object based on the sensed release of the fingers of the user from the outer surface of the handle 112. Additionally, or alternatively, one or more processors of a communicatively coupled computing device (e.g., a host computing device, a game console, etc.) that the controller 100 is interacting with may detect the gesture(s) using the touch data.

In some instances, the capacitive pads 602 may also detect a capacitance value that corresponds to an amount of force applied to an associated portion of the controller 100 (e.g., a force applied to an outer surface of the handle 112, to at least one thumb-operated control 114, 115, 116, etc.). Additionally, or alternatively, the touch sensor 600, or other portions of the controller 100 (e.g., the handle 112), may include a force sensing resistor (FSR), which uses variable resistance to measure an amount of force applied to the FSR. As the controller 100 may be configured to be held by a hand of a user, the FSR may mount on a planar surface of a structure within the controller body 110, such as a structure that is mounted within the handle 112 of the controller body 110, or a structure that is mounted underneath the controller body 110. In certain embodiments, the FSR, in conjunction with the capacitive pads 602, may facilitate sensing of both the onset of grasping by the user, and the relative strength of such grasping by the user, which may be facilitate certain gameplay features. In either instance, the FSR may generate force data for use in detecting a presence, location, and/or gesture of the finger(s) of the user that grasp the controller 100. When implemented in the controller 100, the FSR and/or the capacitive pads 602 may measure a resistance value, or a capacitance value, respectively, that correspond to an amount of force applied to an associated portion of the controller 100.

In some embodiments, the one or more processors of the controller 100 may utilize the touch sensor data and/or the force data to detect a hand size of a hand grasping the handle 112 and/or to adjust the threshold force required for registering a touch input at the capacitive pads 602 and/or the FSR according to the hand size. This may be useful for making force-based input easier for users with smaller hands (and harder, but not difficult, for users with larger hands).

Figure 7A:
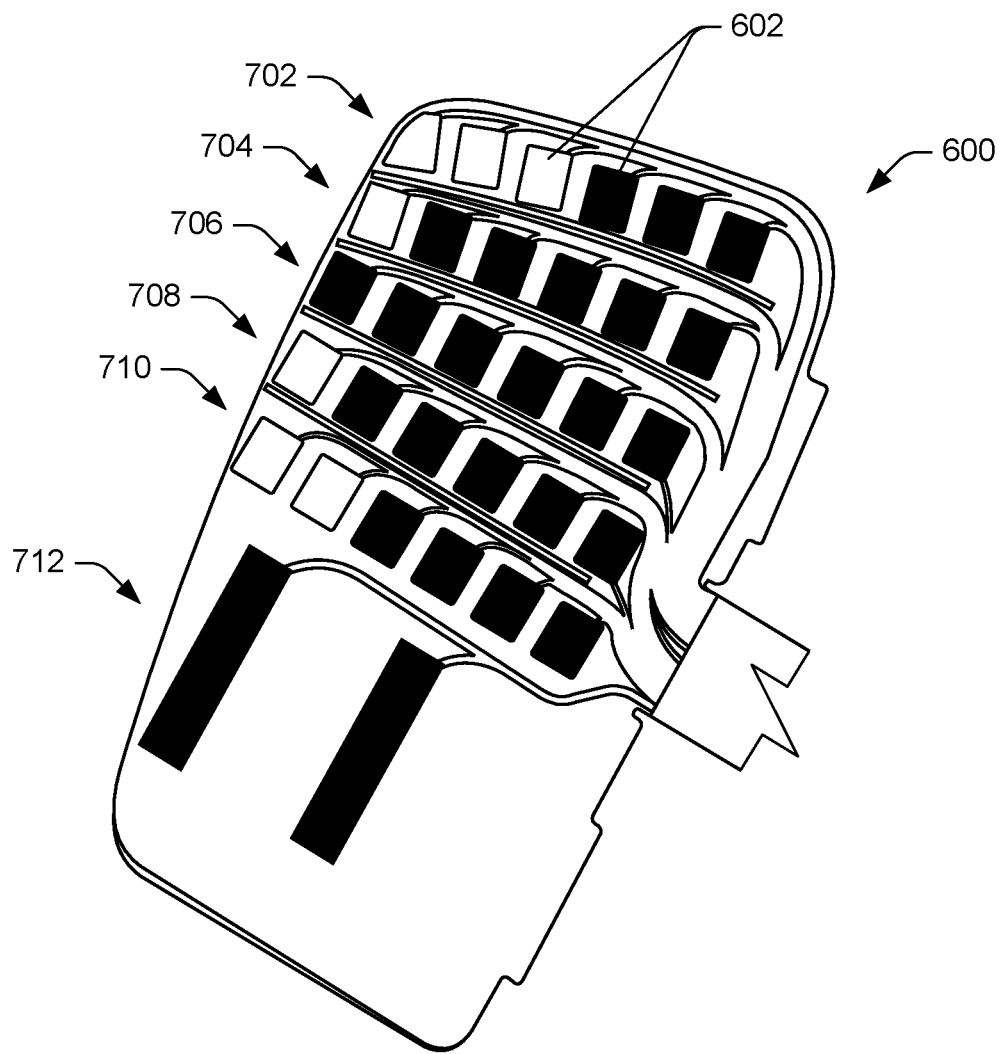
FIG. 7A depicts a first controller configuration of the touch sensor of FIG. 6, according to an example embodiment of the present disclosure.
Figure 7B:
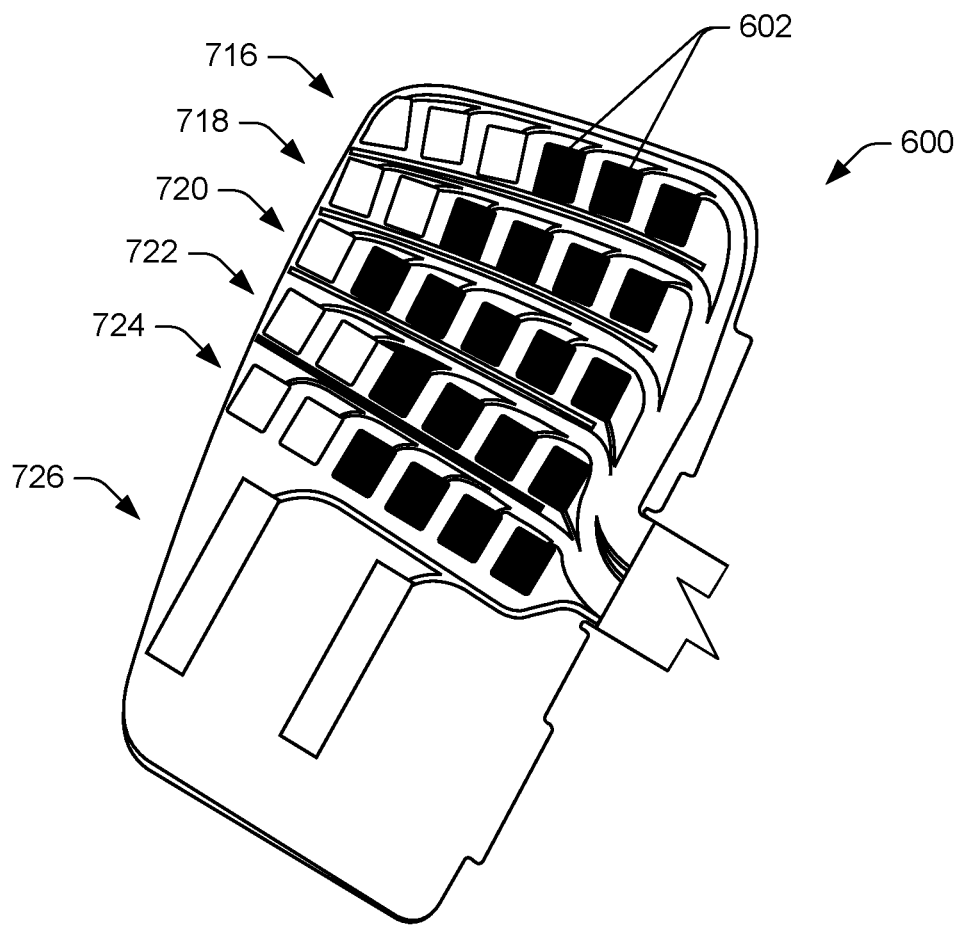
FIG. 7B depicts a second controller configuration of the touch sensor of FIG. 6, according to an example embodiment of the present disclosure.
Figure 7C:
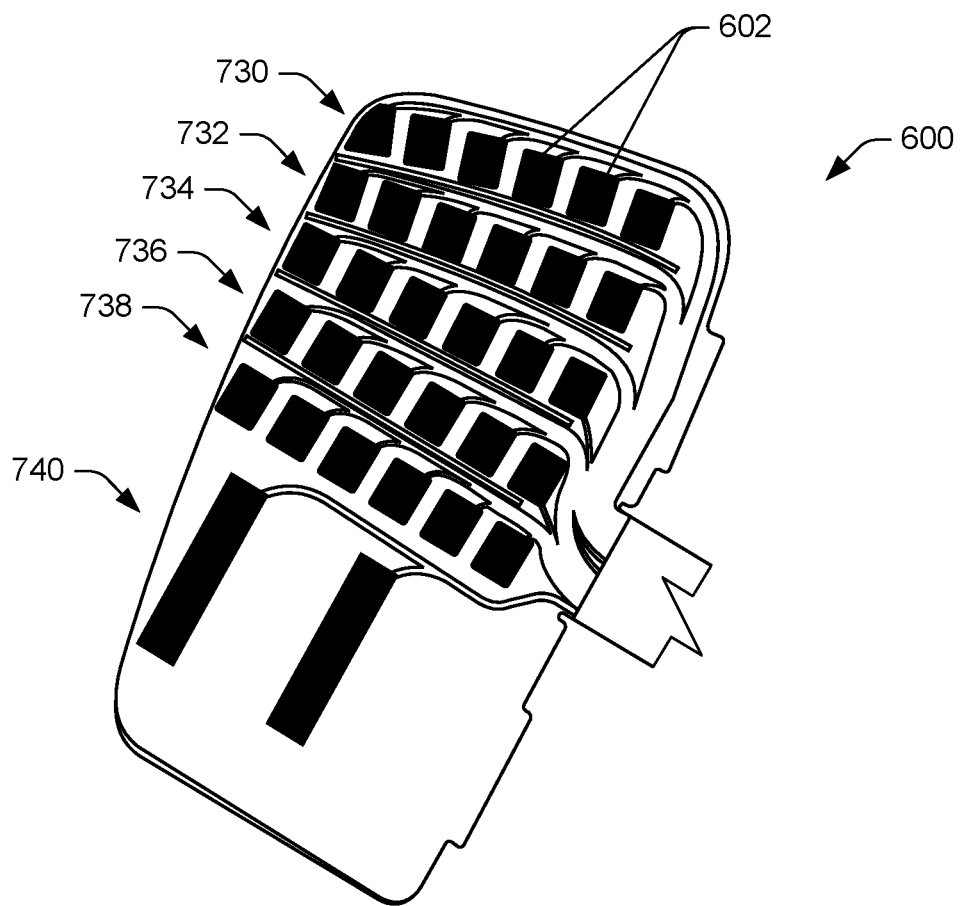
FIG. 7C depicts a third controller configuration of the touch sensor of FIG. 6, according to an example embodiment of the present disclosure.

FIGS. 7A-7C illustrate various controller configurations. As noted above, depending on the grip of the user, capacitive pads 602 of the touch sensor 600 may correspond to or associated with a particular finger of the user. The various controller configurations may map capacitive pads 602 to a respective finger and a corresponding portion of the finger (e.g., base, tip, middle, and so forth). In doing so, the touch sensor data generated from the touch sensor 600, or the capacitance values from individual capacitive pads 602, may be associated with a respective finger of the user for use in generating image data representing a gesture of the hand.

FIG. 7A illustrates a first controller configuration 700, showing those capacitive pads 602 of the touch sensor 600 whose capacitance values are utilized when generating image data of a hand gesture. That is, in FIG. 7A, the "shaded-in" capacitive pads 602 represent those capacitive pads 602 whose touch sensor data is utilized to generate image data corresponding to the gesture of the hand. Comparatively, the capacitive pads 602 not shaded-in represent those capacitive pads 602 whose capacitance values are not utilized in generating image data corresponding to the gesture of the hand. However, the capacitive pads 602 not shaded-in may still measure capacitance values for the purpose of changing controller configurations. For instance, in the first controller configuration 700, if the user touches one of the capacitive pads 602 that are not shaded-in, the controller 100 or a communicatively coupled computing device may use this information to determine whether to change controller configurations.

Turning to the specifics of the first controller configuration 700, a first row 702, a second row 704, and a third row 706 of the touch sensor 600 may correspond to a first finger (e.g., middle finger) of the user. A fourth row 708 and a fifth row 710 of the touch sensor 600 may correspond to a second finger (e.g., ring finger) of the user. A sixth row 712 of the touch sensor 600 may correspond to a third finger (e.g., pinky finger) of the user. Through corresponding the rows of the touch sensor 600 with certain fingers of the user, and certain capacitive pads 602 of the rows with certain fingers, the capacitance values generated by the capacitive pads 602 of the touch sensor 600 may be utilized to generate image data depicting a gesture of the hand (i.e., how the user is holding the controller 100). For instance, if the user grips the controller 100 while the controller 100 is configured according to the first controller configuration 700, and the user does not grip the controller 100 with his or her first finger, the capacitance values received at rows 702, 704, and 706 may indicate that the first finger is not touching the controller 100.

In other words, the capacitance values for the first row 702, the second row 704, and the third row 706, which are associated with the first finger, may indicate that the first finger is not touching the controller 100. Instead, the capacitance values from capacitive pads 602 of the first row 702, the second row 704, and/or the third row 706 may indicate touching distance or proximity the first finger hovers above the controller 100. Additionally, the capacitive pads 602 associated with the fourth row 708, the fifth row 710, and the sixth row 712 may detect capacitance values that indicate the second and third fingers touch the controller 100. Such capacitance values received by the respective capacitive pads 602 may be utilized to generate image data of the hand showing the index finger extended (e.g., pointing), as compared to curled around an object, for instance. Accordingly, the capacitance values from the individual capacitive pads 602 may be utilized to determine how far the fingers of the user are disposed from the controller 100. However, as noted above, those capacitive pads 602 whose capacitance values are not utilized to generate the image data may be utilized by the controller 100 determined whether to configure the controller 100 according to another controller configuration.

FIG. 7B illustrates a second controller configuration 714, showing those capacitive pads 602 of the touch sensor 600 whose capacitance values are utilized when generating image data. For instance, in FIG. 7B, the "shaded-in" capacitive pads 602 represent those capacitive pads 602 whose capacitance values are utilized to generate image data corresponding to a gesture of the hand. Comparatively, the capacitive pads 602 not shaded-in represent those capacitive pads 602 whose capacitance values are not utilized to generate image data corresponding to the gesture of the hand. However, the capacitive pads 602 not shaded-in may still measure capacitance values for the purpose of determining whether to switch between controller configurations.

In the second controller configuration 714, a first row 716, a second row 718, and a third row 720 of the touch sensor 600 may correspond to a first finger of the user. A fourth row 722 may correspond to the second finger of the user and a fifth row 724 of the touch sensor 600 may correspond to the third finger of the user. Compared to the first controller configuration 700, the second controller configuration 714 may represent a smaller grip (or hand size) of the user operating the controller 100. In other words, for the second controller configuration 714, the grip of the user may not touch a sixth row 726 of the touch sensor 600. Through corresponding the rows of touch sensor 600 with certain fingers the capacitance values generated by the touch sensor 600 are utilized to generate image data depicting a gesture of the hand (i.e., how the user is holding the controller). By way of illustration and comparing the second controller configuration 714 to the first controller configuration 700, because the second controller configuration 714 may correspond to a smaller grip of the handle 112, a generated hand according to the second controller configuration 714 may be smaller than a generated hand according to the first controller configuration 700.

By dynamically remapping the capacitive pads 6062 of the touch sensor 600, the capacitive pads 602 may be associated with different fingers of the user or may not be associated with fingers of the user. As such, the second controller configuration may better match a user with a smaller hand size and/or a smaller finger size, as compared to the first controller configuration 700. For instance, using the first controller configuration 700 for the user with smaller hands not may accurately depict a hand gesture of the user as the user may be able to touch the sixth row 712 and as different rows of the first controller configuration 700 correspond to different fingers of the user. Accordingly, the second controller configuration 714 may more accurately associate the capacitive pads 602 with certain fingers of the user.

FIG. 7C illustrates a third controller configuration 728, showing those capacitive pads 602 of the touch sensor 600 whose capacitance values are utilized when generating image data. That is, in FIG. 7C, the "shaded-in" capacitive pads 602 represent those capacitive pads 602 whose capacitance values are utilized to generate image data corresponding to a gesture of the hand. Comparatively, the capacitive pads 602 not shaded-in represent those capacitive pads 602 whose capacitance values are not utilized to generate image data corresponding to the gesture of the hand. However, the capacitive pads 602 not shaded-in may still measure capacitance values and generate touch sensor data for the purpose of determining whether to switch between controller configurations.

In the third controller configuration 728, all of the capacitive pads 602 of the touch sensor 600 are shown shaded-in. In doing so, for instance, image data depicting the representation of the hand may be generated from capacitance values from all the capacitive pads 602. The third controller configuration 728, compared to the second controller configuration 714, may represent a large hand size or a large grip on the handle 112 of the controller 100. Additionally, compared to the first controller configuration 700, the controller third configuration 728 may correspond to a hand having larger finger lengths, as indicated by all the capacitive pads 602 in the rows being shaded in (as compared to the first controller configuration 700). In the third controller configuration 728, a first row 730, a second row 732, and a third row 734 of the touch sensor 600 may correspond to the first finger of the user. A fourth row 736 and a fifth row 738 of the touch sensor 600 may correspond to the second finger of the user. A sixth row 740 of the touch sensor 600 may correspond to the third finger of the user.

With the above description, the capacitive pads 602 of the touch sensor 600 may remap to correspond to different fingers of the user. Depending on the grip of the user or the hand size of the user, a particular row or rows, for instance, of the touch sensor 600 may correspond to a particular finger of the user (e.g., middle finger), while in other instances, may correspond to a different finger of the user (e.g., ring finger). Through receiving touch sensor data (e.g., capacitance values) indicative of the grip or finger positions of the user, the capacitive pads 602 of the touch sensor 600 may remap and correspond to different fingers of the user(s). In other words, the capacitive pads 602 may be designated in some instances to correspond to different fingers of the user depending on the grip of a particular user with the handle 112 of the controller 100. In this sense, the controller 100 may include different controller configurations (i.e., the first controller configuration 700, the second controller configuration 714, and the third controller configuration 728) to correspond different capacitive pads 602 with different fingers. Compared to conventional techniques, this dynamic adapting of capacitive pads 602 to certain fingers may allow for accurate gestures of the user to be generated in a VR environment.

Additionally, while FIGS. 7A-7C illustrate certain controller configurations or a certain amount of capacitive pads, the touch sensor 600 may embody additional controller configurations. For instance, any combination of the capacitive pads 602, groups 610, or rows of capacitive pads 602, may correspond to a particular finger or grip of the user. Further, the touch sensor 600 may include mappings or capacitive pads 602 for more than three fingers. The touch sensor 600 may therefore associate with the grip of the user and the capacitive pads 602 may map to certain fingers of the user.

FIGS. 8-11 illustrate various processes as a collection of blocks in a logical flow graph, which represent a sequence of operations that can be implemented in hardware, software, or a combination thereof. In the context of software, the blocks represent computer executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 8:
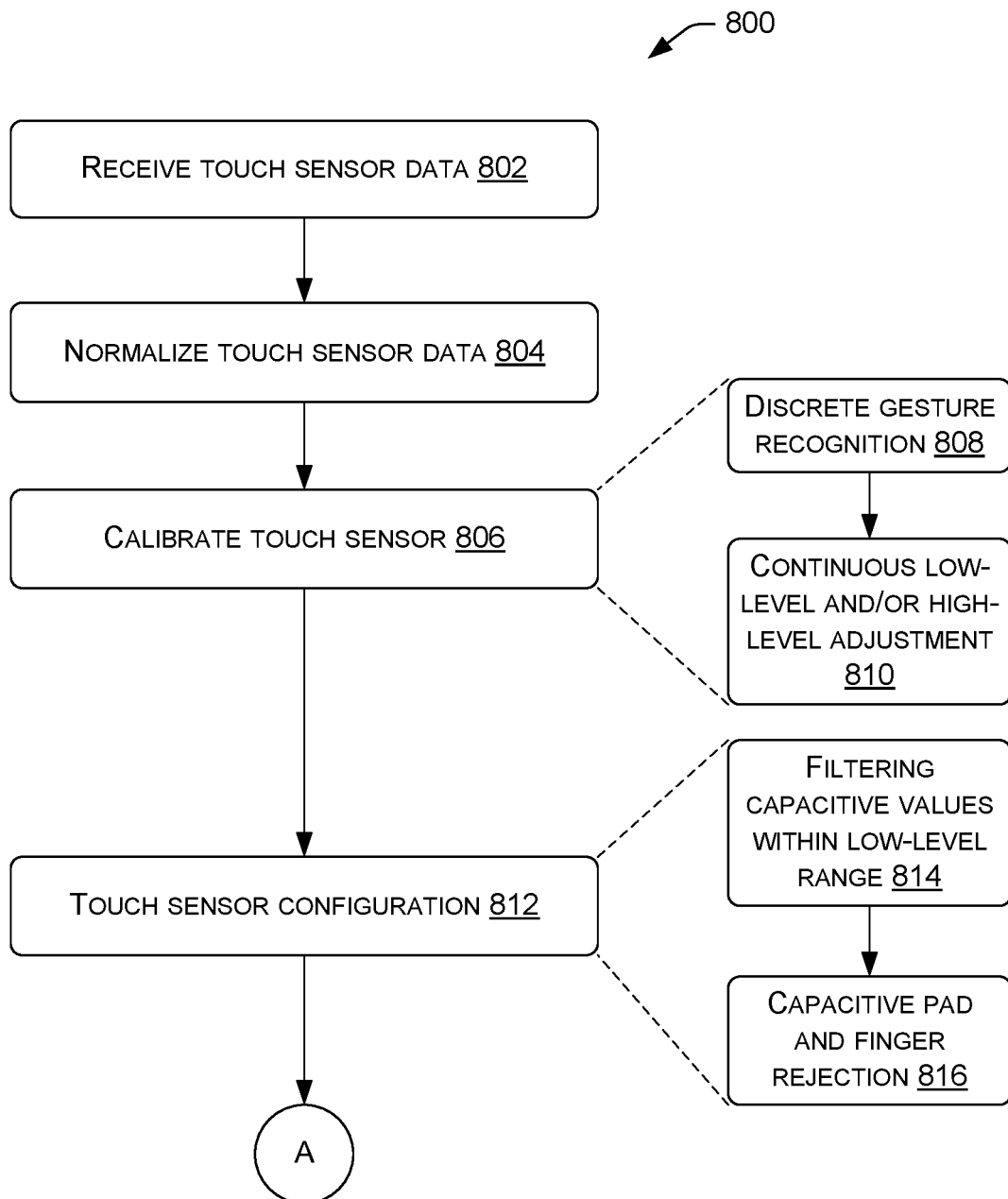
FIGS. 8-11 depict example processes for configuring a touch sensor of a controller according to an example embodiment of the present disclosure.

FIG. 8 is a flow diagram of an example process 800 for calibrating and configuring a touch sensor 600 for different controller configurations. At 802, logic of a controller 100 may receive touch sensor data from the touch sensor 600. For instance, an object (e.g., finger, thumb, etc.) may contact the controller 100 or come within a proximity of the controller 100 (e.g., above the handle 112). The touch sensor data may indicate a capacitance value detected or measured by the capacitive pads 602 of the touch sensor 600. For instance, if the finger is touching the controller 100, the capacitance value may be larger than compared to a finger that hovers above the controller 100 without touching the controller 100. In this sense, the capacitance value may indicate a proximity of the fingers relative to the controller 100. The logic of the controller 100 may convert the capacitance value into a digitized value.

In some instances, the touch sensor data received at 802 may represent raw data that is not calibrated and/or normalized with other the touch sensor data provided from other capacitive pads 602. That is, the touch data received at 802 may represent raw data in the sense that for a particular capacitive pad 602, the capacitive pad 602 may detect capacitance values or a range of capacitance values depending on the size of the capacitive pad 602 and the size of the finger(s) and/or hand of the user touching the controller 100.

At 804, logic of the controller 100 may normalize the touch sensor data. For instance, through iteratively receiving touch sensor data from the touch sensor 600 (e.g., as a user interacts with the controller 100), the touch sensor data may indicate capacitance values measured by the capacitive pads 602. Over time, the capacitance values may indicate a range of capacitance values detected or measured by the individual capacitive pads 602 of the touch sensor 600. For instance, the capacitive pads 602 may detect a high capacitance value when the user grips a portion of the controller 100 residing above the capacitive pad 602, and may detect a low capacitance value when the user does not grip the portion of the controller 100 residing above the capacitive pad 602. Accordingly, at 804, for respective capacitive pads 602 of the touch sensor 600, logic of the controller 100 may analyze the touch sensor data and determine the range of capacitance values received, the maximum capacitance value received, the minimum capacitance value received, the average capacitance value, and/or the median capacitance value. In some instances, the capacitance value may be normalized in a range of [0, 1].

At 806, logic of the controller 100 may calibrate the touch sensor 600. As shown by the sub-blocks in FIG. 8, the process 800 may involve more detailed operations for calibrating the touch sensor 600. For example, calibrating the touch sensor 600 may include sub-blocks 808 and 810. As shown by sub-block 808, calibrating the touch sensor 600 may include a discrete gesture recognition. The discrete gesture recognition may correspond to a discrete gesture performed by the user at the controller 100. For instance, if all or a majority of the capacitance values of the capacitive pads 602 suddenly drop, the logic may associate this drop with the user releasing his or her hand from the controller 100 or releasing a particular finger from the controller 100. The capacitance values received as the user suddenly releases his or her finger from the controller 100 may correspond to a low-level value of a range of capacitance values detected for a particular capacitive pad 602 (e.g., the capacitance value represents when the finger is not touching the controller 100). The capacitance values received prior to the sudden drop may correspond to a high-level value of the range of capacitance values detected for the particular capacitive pad 602 (e.g., the capacitance value represents when the finger is touch the controller 100). With the range of capacitance values, the logic of controller 100 may calculate a bias and a scale factor for capacitance values received by the controller 100. That is, knowing the scale factor for a capacitive pad 602 allows for the normalization of capacitance values received.

As shown by sub-block 810, calibrating the touch sensor 600 may also include a continuous low-level and/or high-level adjustment. As the logic of the controller 100 continuously receives touch sensor data from the touch sensor 600, the logic may continuously monitor the touch sensor data to re-calibrate the low-level capacitance value and/or the high-level capacitance value for the range of capacitance values of a given capacitive pad 602. For instance, through continuously receiving the touch sensor data from the individual capacitive pads 602, logic of the controller 100 may determine whether the received capacitance values are lower than or higher than the previously determined low-level capacitance value and/or the high-level capacitance value, respectively. Based on this determination, the logic of the controller 100 may update the low-level capacitance value or the high-level capacitance value, thereby adjusting the range of capacitance values for a particular capacitive pad 602. In doing so, the bias and/or scale factor may be updated for use in normalizing the capacitance values.

Calibrating the touch sensor 600 may therefore aid in calculating the bias and scale factor for a particular capacitive pad 602 and for a particular user operating the controller 100.

At 812, the logic of the controller 100 may configure the touch sensor 600, whereby the capacitive pads 602 are assigned to certain fingers of the user based on the particular controller configuration. For instance, knowing that the middle finger is disposed above the ring finger and the ring finger is disposed above the pinky finger the controller 100 may map certain capacitive pads 602 and their capacitance values to certain fingers of the user. This mapping may occur for each controller configuration whereby the capacitive pads 602 are respectively mapped to a corresponding finger and/or a corresponding portion of the finger. However, as noted above, not all capacitive pads 602 may be assigned to a finger. As shown by the sub-blocks in FIG. 8, the process 800 may involve more detailed operations to configure the touch sensor 600. For example, configuring the touch sensor 600 may involve filtering noise at the low-level range capacitance values, at sub-block 814, and a capacitive pad and finger rejection, at sub-block 816, each of which are discussed in turn.

At sub-block 814, the process 800 may filter noise within a low-level range of capacitance values. For instance, when a finger is not touching the controller 100 (e.g., hovering above the handle 112 or in close proximity to the handle 112), those capacitive pads 602 associated with the finger may be susceptible to noise. In other words, at the low-level range of capacitance values for a capacitive pad 602, a small amount of measured capacitance may result in changes of the finger position of the user. Generating image data corresponding to these changes may result in unpleasant finger twitching within a VR environment. Instead, in instances where the capacitance values from the touch sensor 600 for individual capacitive pads 602 fall below a certain threshold, are below threshold change from previous capacitance values, or if the capacitance values are within a certain threshold of the low-level capacitance value for the capacitive pad 602, the logic of the controller 100 may suppress the capacitance value. In doing so, the controller 100 may ignore minor spurious touch inputs at the touch sensor 600 that may otherwise result in finger twitching within the VR environment.

The capacitive pad and finger rejection, at sub-block 816, may include identifying capacitive pads 602 whose low-level capacitance value or high-level capacitance value are within a threshold range of one another. For instance, if the low-level and high-level capacitance values are separated by a small range, the capacitive pad may be unable to accurately sense and detect the finger positions of the user in sufficient detail. Here, as a capacitive pad 602 may detect capacitance values within a threshold range, the measured capacitance values may not accurately correspond to the finger position.

Additionally, or alternatively, certain fingers may be associated with a number of capacitive pads 602 that decreases the reliability of the detected capacitance values. In these scenarios, capacitance values received by the capacitive pads 602 may introduce noise. Disregarding certain capacitive pads 602, or groups of capacitive pads 602, may increase a reliability that the capacitance values correspond to the hand gesture of the user.

Figure 9:
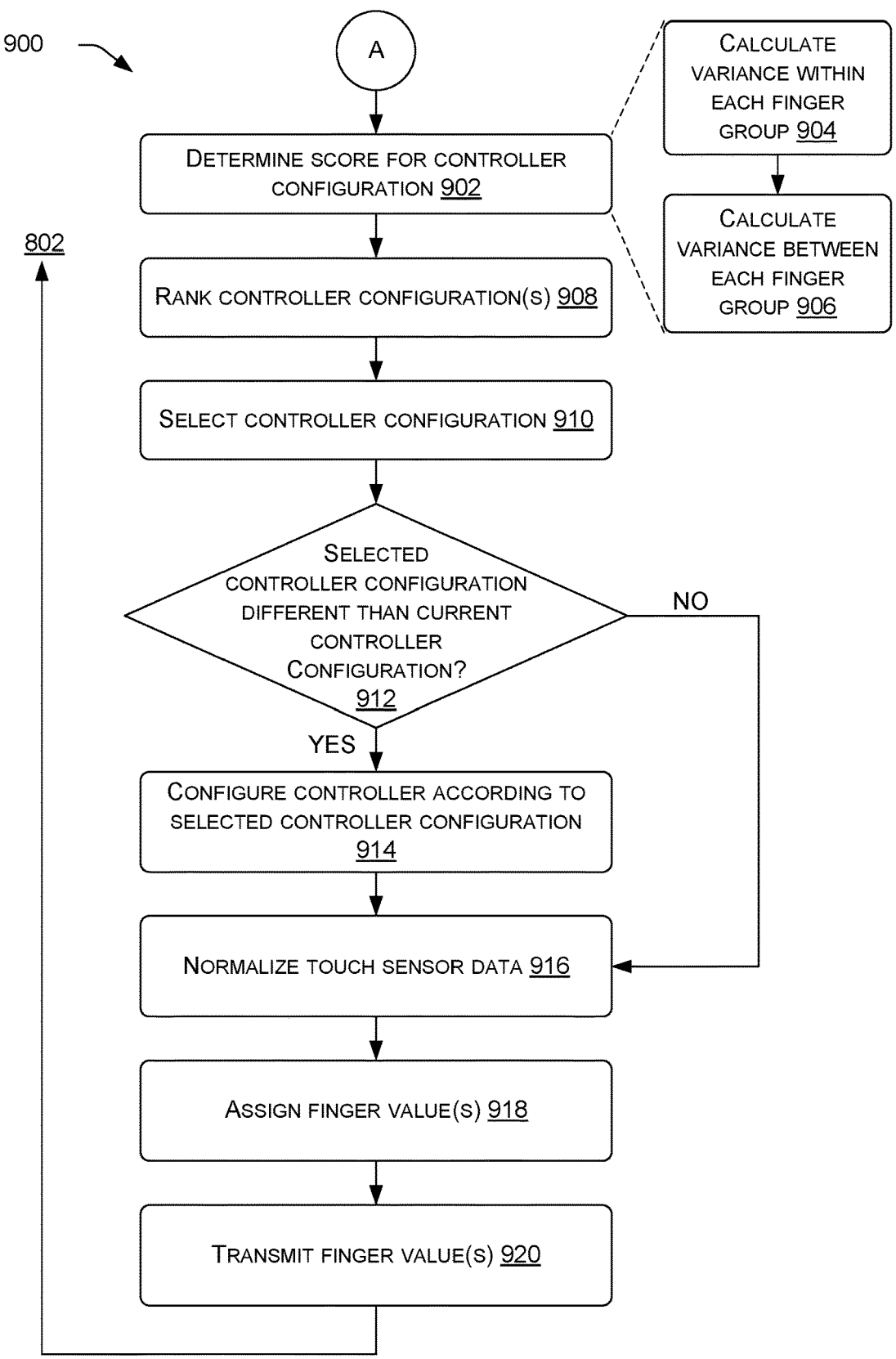

From 812, the process may continue to "A," which is discussed is turn with regard to FIG. 9 and process 900. Additionally, while the process 800 is described being performed by the controller 100, in some instances, the one or more communicatively coupled computing devices may perform all of or a portion of the blocks of the process 800. For instance, as the one or more computing devices may include increased processing, the controller 100 may transmit the touch data received from touch sensor 600 to the computing device for calibrating and normalizing the capacitance values.

FIG. 9 is a flow diagram of an example process 900 for calculating a score for a controller configuration and configuring a controller 100 according to a selected controller configuration. In some instances, the process 900 may continue from "A" of process 800. At 902, logic of the controller 100 may score a plurality of controller configuration(s) using the capacitance values received from the touch sensor 600 (and after normalizing the capacitance values as discussed hereinabove). For instance, logic may access, from a datastore of the controller 100 or from another communicatively coupled computing device, data associated with individual controller configurations of the plurality of controller configurations. The logic may then provide, as inputs to the controller configuration, the touch sensor data. For example, individual controller configurations may have been previously trained and/or calibrated using the process 800 described above. Discussed above, individual controller configurations may designate which capacitive pads 602 of the touch sensor 600 correspond to the fingers of the user. For instance, a first controller configuration may associate first capacitive pads 602 with the middle finger of the user, while a second controller configuration may associate second capacitive pads 602 with the middle finger, where the first capacitive pads 602 and the second capacitive pads 602 are different or represent different combinations of capacitive pads 602.

As shown in the process 900, determining the score for the controller configuration(s) may involve sub-blocks, such as calculating a variance within each finger group of a controller configuration, at 904, and/or calculating a variance between each finger group of a controller configuration, at 906. In some instances, the score for the controller configuration may represent the ratio of the variance within each finger group to the variance between each finger group, which may include an "f-statistic" or an "f-test." The scores may indicate a probability of the controller configuration matching the hand size, finger position, and/or grip of the user. In other words, the controller configuration may represent how closely the fingers of the user align or otherwise associate with the controller configuration. A high score may indicate a closely matched or matched controller configuration whereas a low score may indicate a controller configuration not likely matching the grip of the user. For example, a first score is attributed to a first controller configuration, a second score is attributed to a second controller configuration, and so on and so forth, for any suitable number of controller configurations.

In some instances, the scores for the controller configurations may be initialized (i.e., zeroed) when the controller 100 powers on. As the controller 100 receives the touch sensor data, the logic may calculate the scores for the controller configurations. In doing so, the logic may receive touch sensor data, update the scores for the controller configurations, and over time, as scores for controller configurations are calculated, the logic may select a controller configuration. The controller configuration best matching the grip of the user will have a higher score than the other controller configurations that do not best match the grip of the user.

To illustrate determining the score for a controller configuration, as the user grips the controller 100, the capacitive pads 602 may detect a change in capacitance based on which areas of the controller 100 the user grips or the proximity of the fingers of the user relative to the controller 100. After the touch data is normalized and the touch sensor 600 is calibrated and/or configured (e.g., the process 800), the touch sensor data is used to calculate scores for respective controller configurations. In general, knowing that a user grips the controller 100 with his or her middle finger disposed above the ring finger and his or her ring finger disposed above the pinky finger the capacitance values received at the controller 100 may be associated with the middle finger, the ring finger, and the pinky finger, respectively. Additionally, each of the controller configurations may include a predetermined layout where certain capacitive pads 602 are associated with a certain finger of the user. That is, a group of capacitive pads 602 may correspond to a particular finger. For instance, a large hand configuration may include multiple rows of the capacitive pads 602 associated with the middle finger whereas a small hand configuration may include a single row of the capacitive pads 602 associated with the middle finger.

As the capacitive pads 602 are grouped together and as the user touches or lifts his or her fingers from the controller body 110, those capacitive pads 602 associated with a particular finger of a controller configuration may or may not detect capacitance values. For instance, when the user lifts his or her middle finger from the controller body 110, for a correct controller configuration, those capacitive pads 602 assigned to the middle finger may not measure a capacitance value or may measure low capacitance values. In some instances, the capacitance values of the capacitive pads 602 of the middle finger group may experience a capacitance change in substantially the same amount and at substantially the same time. For instance, for a correct controller configuration (e.g., a controller configuration with a high score), the capacitive pads assigned to a particular finger would experience the substantially the same capacitance or substantially the same change in capacitance at approximately the same time. The capacitive pads 602 for the correct controller configuration associated with the middle finger would therefore statistically correlate with each other and indicate a high correlation with each other or a low variance between one another. Calculating the variance within each finger group, for the individual controller configurations, may represent the variance between those capacitive pads 602 assigned to a particular finger (e.g., "f-statistic" or an "f-test"). Comparatively, a controller configuration having high variances within a finger group may indicate an incorrect controller configuration or a controller configuration not well suited for the grip of the user. That is, controller configurations with high variance within a finger group of capacitive pads 602 may indicate an improper assignment of capacitive pads 602 for respective fingers of the user.

Calculating the variance between finger groups may indicate a variation between one finger group of capacitive pads 602 and another finger group of capacitive pads 602 (e.g., "f-statistic" or an "f-test"). For instance, returning to the above example, as the user lifts his or her middle finger from the controller body 110 but keeps his or her pinky finger in contact with the controller body 110, a high variance may exist between the capacitance values of the capacitive pads 602 assigned to the middle finger and the capacitance values of the capacitive pads 602 assigned to the pinky finger. For each finger and for the different controller configurations, a variance score may be generated. Accordingly, for the middle finger, a variance between middle finger group and pinky finger group is calculated and a variance between middle finger group and ring finger group is calculated. Likewise, a variance may be calculated between the ring finger group and the pinky finger group is. This process may continue for each finger and for each controller configuration. However, while the above example is described with regard to three fingers (e.g., middle, ring, and pinky), the touch sensor 600 may be configured for more or less fingers.

As each controller configuration includes a plurality of determined scores, an aggregation (e.g., sum) of the scores may indicate how closely a specific controller configuration matches the grip of the user. Additionally, in some instances, the process 900 may determine the score for the controller configuration in instances where the capacitance values indicate a high degree of disparity compared to historical capacitance values. For instance, the score for a controller configuration may include a running average, and determining a new score for the controller configuration may update the running average. Here, the average for the controller configuration may be updated if a large disparity, or a disparity above a threshold, exists between the determined score and the previous or average score for the controller configuration. In this sense, a single score for a controller configuration may not skew or improperly weighed against previously calculated scores. Additionally, where large disparities exist, the scores for a controller configuration may be weighted.

At 908, logic of the controller 100 may rank the controller configurations based at least in part on the determined scores. As discussed above, the score associated with an individual controller configuration relates to a probability that the assignment of capacitive pads 602 of the controller configuration maps or represents the grip of the user. That is, the assignment of capacitive pads 602 for the controller configuration matches the respective fingers of the hand.

At 910, logic of the controller 100 may select a controller configuration. The controller configuration may indicate which capacitive pads 602 are associated with each finger of the user. In doing so, as the controller 100 continues to receive touch sensor data from the touch sensor 600, the touch sensor data is associated with particular fingers and particular parts of the finger (e.g., base, tip, etc.) of the user. Knowing which capacitive pads 602 of the touch sensor 600 correspond to a respective finger of the user may assist in accurately generating image data (using the touch sensor data and/or force data) depicting a hand gesture of the user.

At 912, logic of the controller 100 may determine whether the selected controller configuration is different than a current controller configuration of the controller 100. For instance, the controller 100 may include a default controller configuration, and at 912, the process 900 may determine whether the selected controller configuration is different than the default controller configuration. If the controller configurations are the same, meaning that the selected controller configuration (e.g., the highest ranked controller configuration) is already configured on the controller 100, there may be no need to update or assign a different controller configuration. If so, the process 900 may follow the "NO" route and proceed to 916.

Alternatively, if the controller configurations are not the same, meaning that the selected controller configuration (e.g., the highest ranked controller configuration) is not currently implemented on the controller 100, a need exists to update or assign a different controller configuration. In other words, as the grip of the user may change, or the controller 100 may switch between users, the controller configuration may update to assign capacitive pads 602 with respective fingers of the user. If so, the process 900 may follow the "YES" route to 914.

At 914, logic of the controller 100 may configure the controller 100 according to the selected controller configuration. At 914, depending on which controller configuration is selected (at 910), the capacitive pads 602 of the touch sensor 600 may correlate with different fingers or different portions of the finger. Accordingly, in future instances, using the touch sensor data, the logic of the controller 100 may determine which fingers and/or which portions of individual fingers are touching the controller 100 as well as the proximity of certain fingers to the controller 100. Configuring the controller 100 according to the controller configuration may involve assigning capacitive pads 602 of the touch sensor 600 to correspond to certain fingers of the user. The assignment of capacitive pads 602 may include mapping capacitive pads 602 to associate the capacitive pads 602 with a respective finger of the user. In some instances, not all capacitive pads 602 of the touch sensor 600 may map to a respective finger of the user. For instance, if the user has a small hand or a small grip the grip of the user may span a subset of the capacitive pads 602 of the touch sensor 600. In such instances, the capacitance values received from the remaining capacitive pads 602 may not be used when generating image data depicting the hand gesture. By contrast, a large hand may span an entirety of the touch sensor 600, and, in this case, all (or at least a number above a threshold number) of the capacitive pads 602 may provide the touch sensor data for use in generating the image data At 916, logic of the controller 100 may normalize the capacitance values of the capacitive pads 602 using a set of weights applied to the individual capacitive pads 602 of a group of capacitive pads 602 associated with a finger. For instance, the weight assigned to individual pads of the capacitive pads 602 may be associated with the controller configuration. For instance, if four capacitive pads 602 of the touch sensor 600 are associated with the middle finger of a user, an equal weight may be assigned to all four capacitive pads 602. Therefore, the capacitance values received from these four capacitive pads 602 may include a weight of one-quarter. In doing so, the capacitance values from these capacitive pads 602 may include an equal weight that is used when determining a finger position. Additionally, in some instances, the weight of a particular capacitive pad 602 may be set to zero based on the capacitive pad and finger rejection indicating which capacitive pads 602 to ignore or have a reliability below a certain threshold.

Normalizing the touch sensor data at 916 may also involve summing the capacitance values from the capacitive pads 602 for each group of capacitive pads 602. As an example, for a certain controller configuration, if the middle finger is represented by four capacitive pads 602, each capacitance value of the capacitive pad 602 of the middle finger may carry a weight of one-fourth. The logic may weigh the capacitance value for respective capacitive pads 602 for a finger to indicate the influence that the capacitance value for a given capacitive pad 602 has on the summed capacitance values for the finger.

Additionally, or alternatively, normalizing the touch sensor data may include normalizing the touch sensor data according to weights previously applied to the capacitive pads 602. Through the capacitive pad and finger rejection (sub-block 816), not all capacitive pads 602 within a group of capacitive pads 602 may carry an equal weight. As an example, a user might not contact certain capacitive pads 602 with a group. In turn, the logic may reject or not factor the capacitance value of a particular capacitive pad 602 the user does not touch, for instance, if the hand of the user is small or the user places his or her hands differently on the controller 100. For instance, as noted above, if the low-level capacitance value and high-level capacitance value are narrow (i.e., the range is small), the capacitive pad 602 may be susceptible to high amounts of noise. Here, the logic of the controller 100 may disregard certain capacitance values of a capacitive pad 602 within the weighted sum. In instances were capacitance values are not used, the capacitance values being used may be summed and divided by the sum of the weights being used. For instance, if four capacitive pads 602 are assigned to a particular finger, each capacitive pad 602 may have a weight of one-quarter. However, if the capacitance value for one of the capacitive pads 602 is unreliable (e.g., contains a large amount of noise) the weight of the one capacitive pad 602 may be disregarded such that the remaining three capacitive pads have a weight of one-third. Therein, the capacitive values are summed and divided by the sum of the weights of the capacitive pads 602 being used.

At 918, the logic of the controller 100 may assign a finger value to respective fingers of the user based at least in part on the touch sensor data. For instance, after normalizing the touch sensor data and associating the touch sensor data with particular fingers, the controller 100 may determine a finger value on a scale of [0, 1]. The finger value assigned to fingers of the user may indicate a relative position or curl of the finger relative to the controller 100. In this sense, the controller 100, using the capacitance values detected from individual capacitive pads, may determine the finger positions of the user relative to the controller 100. In some instances, the controller 100 may determine finger values for each finger of the user or those fingers for which the touch sensor 600 is configured.

At 920, the logic of the controller 100 may transmit the finger values (e.g., indication) to one or more computing devices. In some instances, the one or more computing devices may utilize the finger values to generate image data depicting a gesture of the hand of the user on the controller 100. In some embodiments, the one or more computing devices may perform additional analysis on the finger value. For instance, the one or more computing devices may utilize curl logic when generating a curl of the finger in the image data. Moreover, in some instances, the controller 100 may transmit additional data captured and/or received by the controller, such as force data from a pressure sensor of the controller 100 upon a press of the surface by the at least one finger.

From 920, the process 900 may loop to step 802 of the process 800. Accordingly, the controller 100 may continuously receive capacitance values for use in generating image data according to the grip of the user and for use in determining whether to update the controller configuration of the controller 100.

While some or all of the process 900 is described being performed by the controller 100, in some instances, the one or more communicatively coupled computing device may perform all of or a portion of the blocks of the process 900. For instance, as the computing device may include increased processing power, the controller may transmit the touch data received from touch sensor 600 to the computing device for determining the scores for the controller configuration. In turn, the computing device may transmit the controller configuration to the controller 100, or transmit an indication of the controller configuration to the controller 100.

Figure 10:
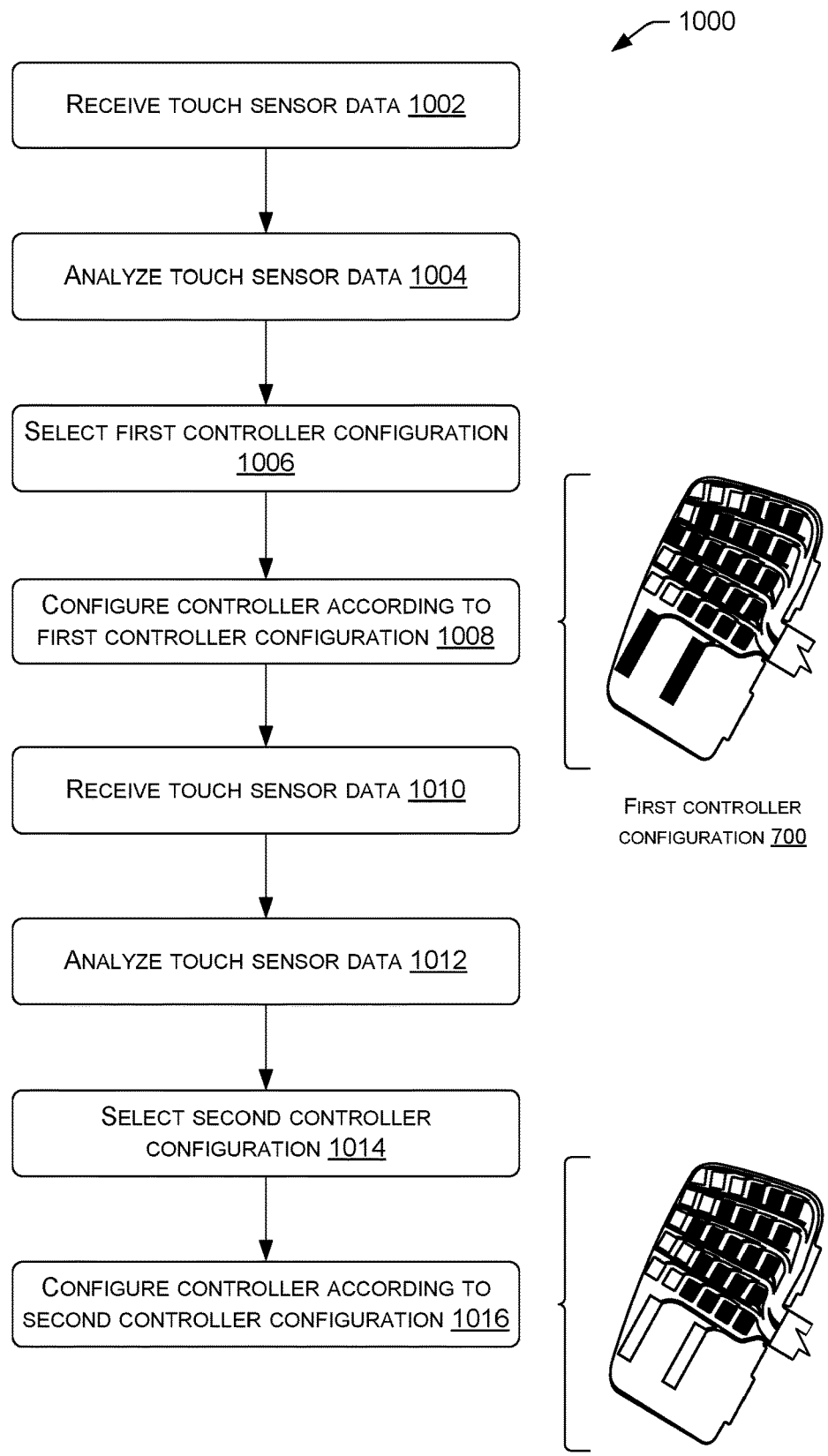

FIG. 10 illustrates an example process 1000 for configuring a controller 100 according to one or more controller configurations. At 1002, the process 1000 may receive touch sensor data from a touch sensor 600 of the controller 100. In some embodiments, the touch sensor data may indicate the capacitance values detected by respective capacitive pads 602 of the touch sensor 600.

At 1004, the process 1000 may analyze the touch sensor data. In some instances, analyzing the touch sensor data may include the processes 800 and/or 900 described herein above, whereby the touch sensor data is normalized and the touch sensor 600 is calibrated. For instance, logic of the controller 100 may analyze the touch sensor data and determine a score for respective controller configurations. Selecting the controller configuration may involve determining a ratio of (1) the variance of capacitance values within a group of capacitive pads 602 assigned to a particular finger and (2) the variance of capacitance values between groups of capacitive pads. For instance, determining a variance within a finger group may include determining a variance in capacitance between a first capacitive pad and a second capacitive pad assigned to a first finger (e.g., "f-statistic" or an "f-test"). Determining a variance between a finger group may include determine a variance in capacitance between a summed capacitance value of the first capacitive pad and the second capacitive pad, and then comparing the summed capacitance value to the summed capacitance values of another group of capacitive pads 602 assigned to a second finger. A ratio is calculated for each controller configuration to determine a most likely matched configuration for the grip of the user. In some instances, the controller 100 may transmit the touch sensor data to a computing device (e.g., game console) for analysis, and the computing device may determine the score for respective controller configurations.

At 1006, the process 1000 may select a first controller configuration 700. For instance, after analyzing the touch sensor data (block 1004), the process 1000 may select a controller configuration (e.g., the first controller configuration 700) that best matches the hand size, finger size, and/or grip of the user. In instances where the computing device selects the first controller configuration 700, the computing device may transmit, to the controller 100, an indication of the selection.

At 1008, the process 1000 may configure the controller 100 according to the first controller configuration 700. As discussed herein, and as illustrated in FIG. 10, configuring the controller 100 according to the first controller configuration 700 may include associating certain capacitive pads 602 of the touch sensor 600 with certain fingers and/or certain portions of the fingers. Associating capacitive pads 602 with certain fingers may also involve grouping one or more capacitive pads 602 together and associating the group of capacitive pads 602 with the finger. Also, as noted above, depending on the hand size and/or grip of the user, not all capacitive pads 602 of the touch sensor 600 may be mapped or otherwise assigned to a finger.

At 1010, the process 1000 may receive touch sensor data from the touch sensor 600 of the controller 100 and at 1012, the process 1000 may analyze the touch sensor data. The touch sensor data may also be utilized to generate image data utilizing the first controller configuration.

At 1014, the process 1000 may select a second controller configuration 714. For instance, after analyzing the touch sensor data (block 1012), the process 1000 may select a controller configuration (e.g., the second controller configuration 714) that best matches the hand size and/or grip of the user. For instance, the grip of the user may change or a different user, having a different grip, may operate the controller 100. In these instances, the controller configuration may update to accurately sense, detect, or otherwise associate different capacitive pads 602 of the touch sensor 600 with fingers of the user.

At 1016, the process 1000 may configure the controller 100 according to the second controller configuration 714. Configuring the controller 100 according to the second controller configuration 714 may include remapping or re-associating certain capacitive pads 602 of the touch sensor to remap to certain fingers of the user, as compared to the first controller configuration 700.

Figure 11:
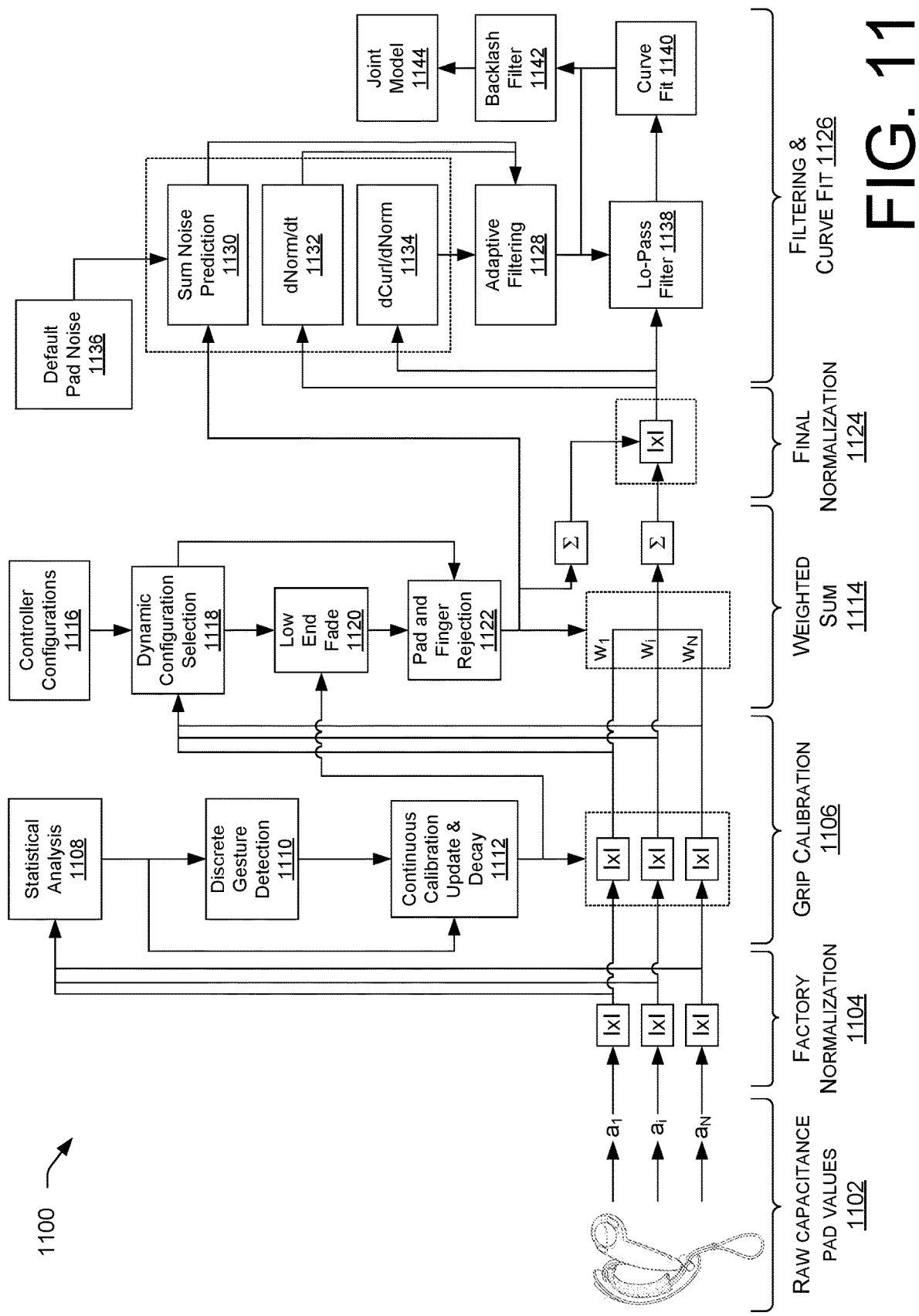

FIG. 11 illustrates a process 1100 for calibrating a touch sensor of a controller, such as the touch sensor 600 of the controller 100, reducing noise within the touch sensor data, and utilizing the touch sensor data to generate image data representative of hand gestures performed by the user. In some instances, the process 1100 may output a finger value or indication representative of a position of the finger, such as how much a finger curls or extends.

At 1102, the process 1100 may receive touch sensor data from the touch sensor 600, where the touch sensor data represents or indicates raw capacitance values detected by capacitive pads (e.g., the capacitive pads 602) of the touch sensor 600. As illustrated in FIG. 11, in some instances, the process 1100 may receive capacitance values from individual capacitive pads 602, as illustrated by $a_1$, $a_i$, and $a_N$. In some instances, the process 1100 may receive the raw capacitive values from the touch sensor 600 for each frame displayed in a VR environment.

At 1104, the process 1100 may perform a factory normalization to normalize the raw capacitance values. For instance, the capacitive pads 602 may have different biases, scale factors, and offsets depending on manufacturing conditions, a size of the capacitive pad 602, and so forth. In some instances, the factory normalization may involve a first order calibration to remove the bias within the capacitance value and normalizing the capacitance value.

At 1106, the process 1100 may perform a grip calibration. As shown, the grip calibration may involve sub-blocks 1108, 1110, and 1112, which are discussed in detail in turn.

At sub-block 1108, the process 1100 may perform a statistical analysis to observe a range of capacitance values, the maximum capacitance value received, the minimum capacitance value received, the average capacitance value, and/or the median capacitance value for respective capacitive pads 602.

At 1110, the process 1100 may perform a discrete gesture detection. Here, the process 1100 may analyze the touch sensor data (i.e., the capacitance values), after being normalized according to the factory normalization, to detect a discrete gesture at the controller 100. For instance, if the touch sensor data indicates that capacitance values of the capacitive pads 602, or a portion thereof, suddenly drop, the process 1100 may associate this drop of capacitance values with the user releasing his or her hand from the controller 100 or releasing a particular finger from the controller 100. The capacitance values received as the user suddenly releases his or her finger from the controller 100 may correspond to a low-level value for a range of capacitance values detected by a particular capacitive pad 602 (e.g., where the capacitance value represents when the finger is not touching the controller 100). The capacitance values received prior to the sudden drop may correspond to a high-level value of the range of capacitance values detected by a particular capacitive pad 602 (e.g., where the capacitance value represents when the finger is touching the controller 100). With the range of capacitance values, the process 1100 may determine a bias and a scale factor for capacitance values of the capacitive pads 602 to normalize the capacitance values received at respective capacitive pads 602.

At 1112, the process 1100 may perform a continuous calibration update and decay. As the process 1100 may continuously receive touch sensor data from the touch sensor 600, the process 1100 may continuously monitor the touch sensor data to re-calibrate or reset the low-level capacitance value and/or the high-level capacitance value for the range of capacitance values for a given capacitive pad 602. In other words, through continuously receiving the touch sensor data from the individual capacitive pads 602, the process 1100 may determine whether the capacitance values are lower than or higher than the previously determined low-level capacitance value of the range and/or the high-level capacitance value of the range, respectively. For instance, as the capacitance changes through a gameplay experience (e.g., hands become sweaty or dry, humidity, temperature, etc.), the process 1100 may determine, or set, a new low-level capacitance value or a new high-level capacitance value, thereby adjusting the range of capacitance values detected by a capacitive pad 602. Additionally, in some instances, the continuous calibration may reduce a dependence on the process 1100 determining the discrete gesture detection at 1110.

In some instances, the process 1100 may assign a weight or percentage to a newly detected low-level capacitance value or a newly detected high-level capacitance value to update the low-level capacitance value or high-level capacitance value, respectively. For instance, if the process 1100 detects a capacitance value below a previously detected low-level capacitance value for a certain amount of time, the process 1100 may weigh the capacitance value to update the low-level capacitance value.

Additionally, the low-level capacitance value or high-level capacitance value may decay over time depending on how the user grips the controller 100, environmental conditions (e.g., humidity), or other properties (e.g., skin wetness). The amount the low-level capacitance value and the high-level capacitance value may decay may be limited, such that the low-level capacitance value and the high-level capacitance value are separated by a threshold amount of range to reduce sensor noise. In some instances, the decay may depend on time and/or a rate of change in the capacitance values. For instance, if the user taps their fingers on the controller 100, or the controller 100 switches users, thereby potentially causing a change in the capacitance values received, the rate of decay may increase to reduce an amount of time required to update the low-level and/or the high-level capacitance values.

As a result of the grip calibration at 1106, and the sub-blocks 1108-1112, the capacitive values sensed from each capacitive pad 602 may be normalized on a scale of [0, 1]. The scale of [0, 1] may represent, for a particular grip of a user and for the individual capacitive pads 602, the high and low levels for the capacitance values sensed from the touch sensor 600.

At 1114, the process 1100 may perform a weighted sum of the capacitive values. As the capacitive values are normalized on the scale of [0, 1], the process 1110 may assign a weight to capacitance values from the capacitive pads 602 depending on the controller configuration. That is, the capacitance values are normalized between [0, 1] and weights are assigned to individual capacitance values received the individual capacitive pads 602. For instance, if a certain controller configuration includes five capacitive pads 602 assigned to a particular finger, the capacitance values may include an equal weight (e.g., one-fifth). In other words, when the capacitive pads 602 detect a maximum capacitance value, the output of the weighted sum may equal one.

As shown, determining the weighted sum may involve sub-blocks 1116, 1118, 1120, and 1122. Sub-block 1116 may include the controller configuration models for the controller 100. Noted above, the controller configurations designate a mapping of capacitive pads 602 of the touch sensor 600 to associate certain capacitive pads 602 with certain fingers of the user.

At sub-block 1118, the process 1100 may perform a dynamic controller configuration selection, where the process 1100 inputs the capacitance values into the controller configuration model(s) to determine a best match, or highest matched, controller configuration according to the grip of the user. Selecting the controller configuration may involve determining a ratio of (1) the variance of capacitance values for a group of capacitive pads 602 assigned to a particular finger and (2) the variance of capacitance values between groups of capacitive pads. A ratio is calculated for each controller configuration to determine a most likely matched configuration for the grip of the user.

At sub-block 1120, the process 1100 may filter noise contained within the capacitance values. For instance, when a finger is not touching the controller 100, such as when a finger is fully extended, those capacitive pads 602 associated with the finger not touching the controller 100 may be susceptible to noise. Here, detecting a small amount of capacitance may cause a large amount of noise within the received capacitance value. In instances where the capacitance values from the touch sensor 600 for individual capacitive pads 602 fall below a certain threshold, or if the capacitance values are within a certain limit of the low-level capacitance value for the capacitive pads 602, the process 1100 may suppress a detected capacitance. In other instances, in such scenarios, the process 1100 may assign a low weight to the capacitance values.

At sub-block 1122, the process 1100 may reject certain capacitance values from capacitive pads 602 of the touch sensor 600 and/or fingers associated with respective capacitive pads 602. For instance, at 1120 the process 1100 may identify capacitive pads 602 that have a small range between the low-level capacitance value or high-level capacitance value. In these scenarios, capacitance values received by the capacitive pads 602 may introduce noise and disregarding certain capacitive pads 602, or groups of capacitive pads 602, may increase a reliability that the touch sensor data corresponds to the hand gesture of the user. That is, if the range of capacitance values detected by a capacitive pad 602 is small, the capacitive pad 602 may be susceptible to large amounts of noise Additionally, or alternatively, certain fingers may be associated with a number of capacitive pads 602 having a low reliability. Rejecting certain fingers, or a group of capacitive pads 602, introduces a contingency behavior for controller configurations for small hand. In these scenarios, a respective finger may associate with adjacent fingers (e.g., pinky finger associates with ring finger).

At 1124, the process 1100 may perform a final normalization. For example, in some instances, a capacitive pad 602 assigned to a particular finger may not detect a capacitance value or the capacitance values may be unreliable. Here, the user may not touch certain capacitive pads 602 of the touch sensor 600 because of the size of the hand or in instances where the user readjusted his or her grip. Additionally, in some instances where the low-level and high-level capacitance values are narrow, or separated by a small range, the capacitance values may be unreliable and noise may significantly impact finger motion. To eliminate or decrease noise from these capacitive pad(s) 602, the final normalization 1124 may determine a reliability of the capacitance values, and if a reliability is low, the weight of a capacitive value from a capacitive pad 602 is removed from the weighted sum. Therein, the capacitive values are summed and divided by the sum of the weights of the capacitive pads 602 being used.

At 1126, the process 1100 may filter and curve fit the touch sensor data to represent a hand gesture of the user. The filtering and curve fitting may involve linearizing the final normalization of the touch data on the [0, 1] scale to achieve a linear relationship between the touch sensor data and a position of a finger (e.g., curled, extended, half-way extended, etc.). For instance, the final normalization values determined at 1124 may follow an exponential curve, such that as the hand of the user comes into proximity of the controller 100, or grips the controller 100, the final normalized values exponentially increase. In other words, the summed capacitance value may be exponentially related to the proximity with the finger disposed on/around the controller 100. Linearizing the values on a [0, 1] scale such that the capacitance values are correlated with a finger position may reduce sensitivity and an impact that noise may have when a finger is extended from the controller 100, as well as when a finger touches or is in close proximity to the controller 100.

As shown, the filtering and curve fitting may involve various sub-blocks to achieve final values that are utilized to generate hand gestures. At the filtering and curve fit stage 1126, the process 1100 may apply filtering before or after the curve fit. For instance, the sub-blocks may involve filtering capacitance values within the low-level range of capacitance values when the capacitive pads 602 are susceptible to noise. In other words, within the high-level capacitance range, such as when the fingers grip the controller 100 or are in close proximity to the controller 100, the capacitive pads 602 are less susceptible to noise.

The process 1100 may apply adaptive filtering at 1128 to adjust the amount of filtering performed on the capacitance values. The adaptive filtering may adaptively filter to more aggressively filter the capacitance values within the low-range of capacitance values compared to the capacitance values are within the high range of capacitance values. As shown, the adaptive filtering may involve sub-blocks 1130, 1132, and 1134. In general, the adaptive filtering at 1126 may utilize the results of sub-blocks 1130, 1132, and 1134 to determine how much noise exists in the normalized value to determine an amount of filtering to be applied to the normalized capacitance values. Determining an amount of noise that exists in the capacitance values may involve determining which capacitive pads 602 are being used to generate the capacitance values, as well as the high-level and low-level capacitance values for the respective capacitive pads 602. For instance, the capacitive pads 602 may have a baseline noise and if the range between the high-level and low-level capacitance values for a capacitive pad 602 is low, the baseline noise of the capacitive pad 602 may equate to a large amount of finger movement (i.e., baseline noise is a large fraction of the range of capacitance values the capacitive pad 602 is able to sense). Here, the signal to noise ratio may be high. Comparatively, if the range between the high-level and low-level capacitance values for a capacitive pad 602 is large, then the baseline noise of the capacitive pad 602 may not introduce a large amount of finger movement.

In these scenarios, to reduce the noise within the capacitance values, when the range of capacitance values is small, the process 1100 may filter capacitance values more heavily than when the range of capacitance values is larger. The filtering and curve fit 1126 may be repeated for each capacitive pad 602 as each capacitive pad 602 may include respective high and low level capacitance values. Additionally, the amount of filtering applied at 1126 may depend on which capacitive pads 602 and/or which capacitive pads 602 have been rejected (e.g., pad and finger rejection 1122).

The sum noise prediction at 1130 may filter the capacitance values based on which capacitive pads 602 are being used, the weights assigned the capacitive pads 602, as well as the respective baseline noise for the capacitive pads 602. For instance, the process 1100 may include a default capacitive pad noise at 1128, which may represent an estimated baseline noise for individual capacitive pads 602. The sum noise prediction step at 1130 may therefore determine, for those capacitive pads 602 being used, their respective baseline noise values. The sum noise prediction step may also determine the expected or predicted noise for the capacitive pads 602. For instance, if the capacitive pads 602 being used sense capacitive values over a large range (i.e., between the low level and high level capacitance values), the capacitance values may include a low amount of noise and less filtering may be applied. However, if the range of capacitance values for a capacitive pad 602 is narrow (i.e., between the low level and high level capacitance values), then the capacitance values may include a large amount of noise and the process 1100 may apply a greater amount of filtering.

The dNorm/dt at 1132 may take into consideration a change in capacitance value over time. For instance, if the received capacitance values from a capacitive pad 602 change significantly over a short period of time (e.g., one frame), the potential noise introduced within the capacitance values may be disregarded or weighted accordingly. That is, instead of filtering the capacitive values and introducing latency, if the capacitance values change over a threshold amount over a threshold amount of time, less filtering may be applied to the capacitive values. In this sense, less filtering may be applied when greater finger movement is detected and more filtering may be applied when less finger movement is detected.

The dCurl/dNorm at 1134 may filter the normalized capacitance value based on an amount of capacitance detected. For instance, in the high-range of capacitance values, where the finger grips the controller, less filtering may be applied because the noise may have less of an impact on finger position. However, at the low range of capacitance values, where the finger is displaced from the controller, or in close proximity, more filtering may be applied because small changes in capacitance values may have a significant impact on the position of the finger. Here, a small change in capacitance values may result in a large change of the finger gesture.

At sub-block 1138, the lo-pass filter may represent a tunable lo-pass mean filter that adjusts the amount of filtering on detected capacitance values. In some instances, the amount of filtering may be on a scale of [0, 1] and may be based on the result of the amount of filtering determined at the adaptive filter 1128. That is, the lo-pass filter may filter the capacitance values as determined from the adaptive filtering.

At sub-block 1140, the process 1100 may curve fit the capacitance values on a [0, 1] scale to associate the capacitance values with a position of the finger, or a hand animation. For each finger, the output of the curve fit may include a number for each finger, where the number indicates the finger position of each finger of the hand.

At sub-block 1142, the process 1100 may apply a backlash filter after the curve to filter changes in capacitance values that fall below a threshold. For instance, if the capacitance values do not change by a threshold amount on the [0, 1] scale, the capacitance values may be filtered. Such filtering may reduce perceived finger twitching and motion by the user.

At sub-block 1144, the joint model may correspond to a hand animation (e.g., a hand skeleton). For instance, the joint model may generate a hand animation corresponding to the number assigned to individual fingers of the hand from the curve fit at 1140.

Figure 12:
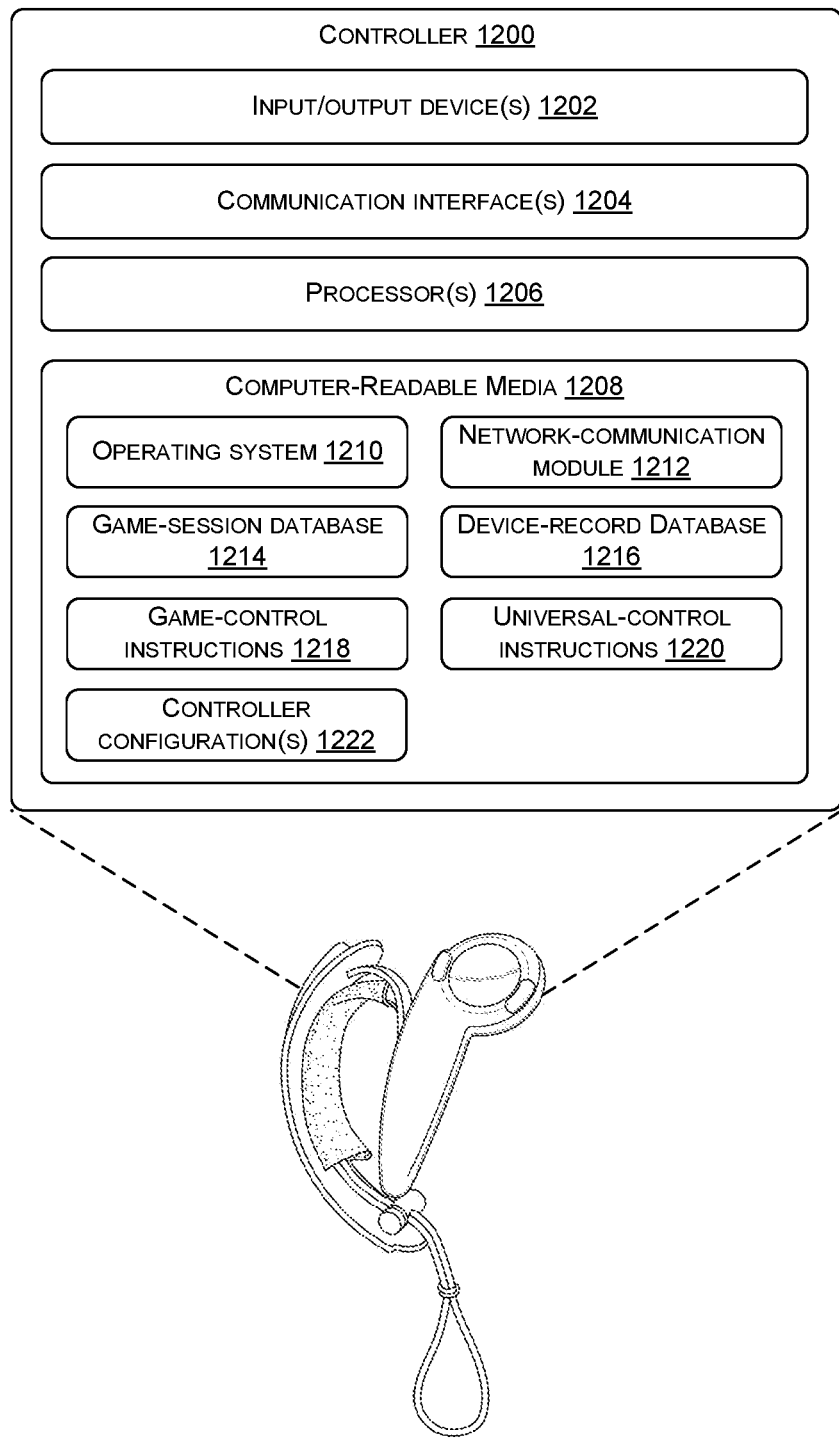
FIG. 12 illustrates example components of the controller of FIG. 1 according to an example embodiment of the present disclosure.

FIG. 12 illustrates example components of a controller 1200, such as the controller 100. As illustrated, the controller 100 includes one or more input/output (I/O) devices 1202, such as the controls described above (e.g., joysticks, trackpads, triggers, etc.), and/or potentially any other type of input or output devices. For example, the I/O devices 1202 may include one or more microphones to receive audio input, such as user voice input. In some implementations, one or more cameras or other types of sensors (e.g., inertial measurement unit (IMU)) may function as input devices to receive gestural input, such as motion of the controller 100. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons. The output devices, meanwhile, may include a display, a light element (e.g., LED), a vibrator to create haptic sensations, a speaker (s) (e.g., headphones), and/or the like. There may also be a simple light element (e.g., LED) to indicate a state such as, for example, when the controller 100 is powered on. While a few examples have been provided, the controller 100 may additionally or alternatively comprise any other type of output device.

In some instances, output by the one or more output devices may be based on input received by one or more of the input devices. For example, selection of a control touch input at the controller 100 may result in the output of a haptic response by a vibrator located adjacent (e.g., underneath) the control and/or at any other location. In some instances, the output may vary based at least in part on a characteristic of the touch input on a touch sensor 600, such as the capacitive pads 602 disposed on/within the handle 112 of the controller 100. For example, a touch input at a first location on the handle 112 may result in a first haptic output, while a touch input at a second location on the handle 112 may result in a second haptic output. Furthermore, a particular gesture on the handle 112 may result in a particular haptic output (or other type of output). For instance, a tap and hold gesture (detected by the touch sensor 600) on the handle 112 may result in a first type of haptic output, while a tap and release gesture on the handle 112 may result in a second type of haptic output, while a hard tap of the handle 112 may result in a third type of haptic output.

In addition, the controller 100 may include one or more communication interfaces 1204 to facilitate a wireless connection to a network and/or to one or more remote systems (e.g., a host computing device executing an application, a game console, other controllers, etc.). The communication interfaces 1204 may implement one or more of various wireless technologies, such as Wi-Fi, Bluetooth, radio frequency (RF), and so on. Additionally, or alternatively, the controller 100 may include physical ports to facilitate a wired connection to a network, a connected peripheral device, or a plug-in network device that communicates with other wireless networks.

In the illustrated implementation, the controller 100 further includes one or more processors 1206 and computer-readable media 1208. In some implementations, the processors(s) 1206 may include a central processing unit (CPU), a graphics processing unit (GPU), both CPU and GPU, a microprocessor, a digital signal processor, or other known processing units or components. Additionally, or alternatively, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1206 may possess its own local memory, which also may store program modules, program data, and/or one or more operating systems.

The computer-readable media 1208 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1208 may be implemented as computer-readable storage media ("CRSM"), which may be any available physical media accessible by the processor(s) 1206 to execute instructions stored on the computer-readable media 1208. In one implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1206.

Several modules such as instruction, datastores, and so forth may be stored within the computer-readable media 1208 and configured to execute on the processor(s) 1206. A few example functional modules are shown as stored in the computer-readable media 1208 and executed on the processor(s) 1206, although the same functionality may alternatively be implemented in hardware, firmware, or as a system on a chip (SOC). An operating system module 1210 may be configured to manage hardware within and coupled to the controller 100 for the benefit of other modules. In addition, the computer-readable media 1208 may store a network-communications module 1212 that enables the controller 100 to communicate, via one or more of the communication interfaces 1204, with one or more other devices, such as a personal computing device executing an application (e.g., a game application), a game console, a remote server, other controller(s), computing devices, or the like. The computer-readable media 1208 may further include a game-session database 1214 to store data associated with a game (or other application) executing on the controller 100 or on a computing device coupled to the controller 100.

The computer-readable media 1208 may also include a device record database 1216 that stores data associated with devices coupled to the controller 100, such as the personal computing device, game console, remote server, or the like. The computer-readable media 1208 may further store game-control instructions 1218 that configure the controller 100 to function as a gaming controller, and universal-control instructions 1220 that configure the controller 100 to function as a controller of other, non-gaming devices. The computer-readable media 1208 may additionally store controller configuration(s) 1222. The controller configuration(s) 1222 may represent or include data associated with the assignment of the capacitive pads 602 of the touch sensor 600 to associate certain capacitive pads 602 with respective fingers of a user operating the controller 100.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A controller comprising:
   a touch sensor having capacitive pads;
   one or more processors; and
   one or more non-transitory computer-readable media storing computer-executable instructions that, when executed by the one or more processors, cause the one or more processors to perform acts comprising:
   receiving from the touch sensor, capacitance values detected by one or more of the capacitive pads, wherein the capacitance values correspond to one or more objects touching or in proximity to the controller;
   determining, for a first controller configuration using the capacitance values, a first variance of capacitance values within individual finger groups of the first controller configuration, wherein the individual finger groups of the first controller configuration include a middle finger, a ring finger, and a pinky finger;
   determining, for a second controller configuration using the capacitance values, a second variance of capacitance values within individual finger groups of the second controller configuration, wherein the individual finger groups of the second controller configuration include the middle finger, the ring finger, and the pinky finger;
   determining, for the first controller configuration using the capacitance values, a first variance of capacitance values between the individual finger groups of the first controller configuration;
   determining, for the second controller configuration using the capacitance values, a second variance of capacitance values between the individual finger groups of the second controller configuration;
   determining a first score for the first controller configuration based on the first variance of capacitance values within the individual finger groups of the first controller configuration and the first variance of capacitance values between the individual finger groups of the first controller configuration;
   determining a second score for the second controller configuration based on the second variance of capacitance values within the individual finger groups of the second controller configuration and the second variance of capacitance values between the individual finger groups of the second controller configuration;

selecting one of the first controller configuration or the second controller configuration; and configuring the touch sensor according to the first controller configuration or the second controller configuration.

2. The controller of claim 1, wherein configuring the touch sensor comprises:

associating first capacitive pads of the touch sensor with the middle finger;

associating second capacitive pads of the touch sensor with the ring finger; and associating third capacitive pads of the touch sensor with the pinky finger.

3. The controller of claim 1, wherein the capacitive pads are arranged into at least one of groups, columns, or rows.

4. The controller of claim 1, wherein the one or more non-transitory computer-readable media store computer-executable instructions that, when executed by the one or more processors, cause the one or more processors to perform an act further comprising ranking the first score and the second score, and wherein selecting the first controller configuration or the second controller configuration comprises selecting a highest ranked score among the first score and the second score.

5. The controller of claim 1, wherein the capacitance values comprises first capacitance values, and wherein the one or more non-transitory computer-readable media store computer-executable instructions that, when executed by the one or more processors, cause the one or more processors to perform acts further comprising:

receiving, from the touch sensor, second capacitance values detected by one or more of the capacitive pads, wherein the second capacitance values correspond to one or more objects touching or in proximity to the controller;

determining, for the first controller configuration using the second capacitance values, a third variance of capacitance values within the individual finger groups of the first controller configuration;

determining, for the second controller configuration using the second capacitance values, a fourth variance of capacitance values within the individual finger groups of the second controller configuration;

determining, for the first controller configuration using the second capacitance values, a third variance of capacitance values between the individual finger groups of the first controller configuration;

determining, for the second controller configuration using the second capacitance values, a fourth variance of capacitance values between the individual finger groups of the second controller configuration;

determining a third score for the first controller configuration based at least in part on the third variance of capacitance values within the individual finger groups of the first controller configuration and the third variance of capacitance values between the individual finger groups of the first controller configuration;

determining a fourth score for the second controller configuration based at least in part on the fourth variance of capacitance values within the individual finger groups of the second controller configuration and the fourth variance of capacitance values between the individual finger groups of the second controller configuration;

selecting one of the first controller configuration or the second controller configuration; and configuring the touch sensor according to the first controller configuration or the second controller configuration.

6. The controller of claim 5, wherein the one or more non-transitory computer-readable media store computer-executable instructions that, when executed by the one or more processors, cause the one or more processors to perform acts further comprising:

determining a running score for the first controller configuration based at least in part on the first score and the third score; and determining a running score for the second controller configuration based at least in part on the second score and the fourth score.

7. A method, comprising:

receiving, from a touch sensor, data representing capacitance values detected by one or more capacitive pads of the touch sensor;

determining, based at least in part on the data, a first score for a first controller configuration of a controller and a second score for a second controller configuration of the controller, wherein:

the first controller configuration comprises:

a first capacitive pad and a second capacitive pad assigned to a first finger; and a third capacitive pad and a fourth capacitive pad assigned to a second finger;

determining the first score comprises:

determining a variance in capacitance between the first capacitive pad and the second capacitive pad;

determining a variance in capacitance between the third capacitive pad and the fourth capacitive pad; and determining a variance in capacitance between a summed capacitance value of the first capacitive pad and the second capacitive pad and a summed capacitance value of the third capacitive pad and the fourth capacitive pad;

the second controller configuration comprises:

a fifth capacitive pad and a sixth capacitive pad assigned to the first finger; and a seventh capacitive pad and an eighth capacitive pad assigned to the second finger;

determining the second score comprises:

determining a variance in capacitance between the fifth capacitive pad and the sixth capacitive pad;

determining a variance in capacitance between the seventh capacitive pad and the eighth capacitive pad; and determining a variance in capacitance between a summed capacitance value of the fifth capacitive pad and the sixth capacitive pad and a summed capacitance value of the seventh capacitive pad and the eighth capacitive pad;

determining a selected controller configuration among the first controller configuration and the second controller configuration; and configuring the touch sensor of the controller according to a selected controller configuration.

8. The method of claim 7, wherein the data comprises first data, the method further comprising:

receiving, from the touch sensor, second data representing capacitance values detected by one or more capacitive pads of the touch sensor;
associating the second data with one or more of the first finger or the second finger based at least in part on the selected controller configuration;
determining, based at least in part on associating the second data with the one or more of the first finger or the second finger, a finger value for at least one of the first finger or the second finger.

9. The method of claim 8, further comprising transmitting the finger value to one or more computing devices.

10. The method of claim 7, further comprising ranking the first score and the second score, and
wherein determining the selected controller configuration comprises determining a highest ranked controller configuration among the first controller configuration and the second controller configuration.

11. The method of claim 7, wherein configuring the touch sensor according to the selected controller configuration comprises associating capacitive pads of the touch sensor according to the first controller configuration or associating capacitive pads of touch sensor according to the second controller configuration.

12. The method of claim 7, wherein the data comprises first data, the selected controller configuration comprises a first selected controller configuration, the method further comprising:
receiving, from the touch sensor, second data representing capacitance values detected by one or more capacitive pads of the touch sensor;
determining, based at least in part on the second data, a third score for the first controller configuration and a fourth score for the second controller configuration, wherein:
determining the third score comprises:
determining a variance in capacitance between the first capacitive pad and the second capacitive pad;
determining a variance in capacitance between the third capacitive pad and the fourth capacitive pad; and
determining a variance in capacitance between a summed capacitance value of the first capacitive pad and the second capacitive pad and a summed capacitance value of the third capacitive pad and the fourth capacitive pad;
determining the second score comprises:
determining a variance in capacitance between the fifth capacitive pad and the sixth capacitive pad;
determining a variance in capacitance between the seventh capacitive pad and the eighth capacitive pad; and
determining a variance in capacitance between a summed capacitance value of the fifth capacitive pad and the sixth capacitive pad and a summed capacitance value of the seventh capacitive pad and the eighth capacitive pad;
determining a second selected controller configuration among the first controller configuration and the second controller configuration; and
configuring the touch sensor of the controller according to the second controller configuration.

13. The method of claim 12, further comprising determining that the second selected controller configuration is different than the first selected controller configuration, and
wherein the configuring the touch sensor of the controller according to the second selected controller configuration is based at least in part on the determining that the second selected controller configuration is different than the first selected controller configuration.

14. A controller comprising:
a touch sensor having capacitive pads;
one or more processors; and
one or more non-transitory computer-readable media storing computer-executable instructions that, when executed by the one or more processors, cause the one or more processors to perform acts comprising:
receiving data corresponding to one or more objects in proximity to the controller;
determining a score for a first controller configuration based at least in part on the data;
determining a score for a second controller configuration based at least in part on the data;
selecting the first controller configuration or the second controller configuration; and
configuring the touch sensor according to the first controller configuration or the second controller configuration.

15. The controller of claim 14, wherein:
the first controller configuration comprises:
a first group of capacitive pads assigned to a middle finger;
a second group of capacitive pads assigned to a ring finger; and
a third group of capacitive pads assigned to a pinky finger; and
the second controller configuration comprises:
a fourth group of capacitive pads assigned to the middle finger;
a fifth group of capacitive pads assigned to the ring finger; and
a sixth group of capacitive pads assigned to the pinky finger.

16. The controller of claim 15, wherein at least one of:
the first group of capacitive pads assigned to the middle finger for the first controller configuration is different than the fourth group of capacitive pads assigned to the middle finger for the second controller configuration;
the second group of capacitive pads assigned to the ring finger for the first controller configuration is different than the fifth group of capacitive pads assigned to the ring finger for the second controller configuration; or
the third group of capacitive pads assigned to the pinky finger for the first controller configuration is different than the sixth group of capacitive pads assigned to the pinky finger for the second controller configuration.

17. The controller of claim 15, wherein the data indicates a capacitance value detected by the capacitive pads of the touch sensor, and wherein:
the score for the first controller configuration includes:
a variance in capacitance values of the capacitive pads of the first group;
a variance in capacitance values of the capacitive pads of the second group;
a variance in capacitance values of the capacitive pads of the third group; and
a variance between the capacitance values of the first group, the second group, and the third group; and
the score for the second controller configuration includes:
a variance in capacitance values of the capacitive pads of the fourth group;
a variance in capacitance values of the capacitive pads of the fifth group;
a variance in capacitance values of the capacitive pads of the sixth group; and a variance between the capacitance values of the fourth group, the fifth group, and the sixth group.

18. The controller of claim 14, wherein selecting the first controller configuration or the second controller configuration comprises selecting a highest ranked controller configuration among the first controller configuration or the second controller configuration.

19. The controller of claim 14, wherein the configuring the touch sensor according to the first controller configuration or the second controller configuration comprises:
- associating first capacitive pads of the capacitive pads with a middle finger;
- associating second capacitive pads of the capacitive pads with a ring finger; and
- associating third capacitive pads of the capacitive pads with a pinky finger.

20. The controller of claim 19, wherein the one or more non-transitory computer-readable media store computer-executable instructions that, when executed by the one or more processors, cause the one or more processors to perform acts comprising configuring the touch sensor of the controller according to another of the first controller configuration or the second controller configuration, and wherein configuring the touch sensor according to another of the first controller configuration or the second controller configuration comprises:
- associating fourth capacitive pads of the capacitive pads with the middle finger;
- associating fifth capacitive pads of the capacitive pads with the ring finger; and
- associating sixth capacitive pads of the capacitive pads with the pinky finger.

* * * * *